US011436193B2

(12) United States Patent
Patel et al.

(10) Patent No.: US 11,436,193 B2
(45) Date of Patent: Sep. 6, 2022

(54) SYSTEM AND METHOD FOR MANAGING DATA USING AN ENUMERATOR

(71) Applicant: Dell Products L.P., Hopkinton, MA (US)

(72) Inventors: Dharmesh M. Patel, Round Rock, TX (US); Rizwan Ali, Cedar Park, TX (US); Ravikanth Chaganti, Bangalore (IN)

(73) Assignee: Dell Products L.P., Hopkinton, MA (US)

( * ) Notice: Subject to any disclaimer, the term of this patent is extended or adjusted under 35 U.S.C. 154(b) by 217 days.

(21) Appl. No.: 16/588,725

(22) Filed: Sep. 30, 2019

(65) Prior Publication Data

US 2021/0097026 A1 Apr. 1, 2021

(51) Int. Cl.
*G06F 16/16* (2019.01)
*G06F 16/174* (2019.01)
*G06F 16/387* (2019.01)
*G06F 16/33* (2019.01)
*G06F 16/182* (2019.01)

(52) U.S. Cl.
CPC .......... *G06F 16/164* (2019.01); *G06F 16/174* (2019.01); *G06F 16/1824* (2019.01); *G06F 16/3331* (2019.01); *G06F 16/387* (2019.01)

(58) Field of Classification Search
CPC .............................. G06F 16/164; G06F 16/174
See application file for complete search history.

(56) References Cited

U.S. PATENT DOCUMENTS

| 8,914,338 | B1* | 12/2014 | Wallace | G06F 3/0608 |
| | | | | 707/693 |
| 9,830,111 | B1* | 11/2017 | Patiejunas | G06F 3/0689 |
| 2010/0094817 | A1* | 4/2010 | Ben-Shaul | G06F 16/174 |
| | | | | 707/697 |
| 2012/0110346 | A1* | 5/2012 | Resch | G06F 16/11 |
| | | | | 713/189 |
| 2012/0323861 | A1* | 12/2012 | Acuna | G06F 16/174 |
| | | | | 707/692 |
| 2016/0275101 | A1* | 9/2016 | Hinterbichler | G06F 16/1734 |
| 2018/0150471 | A1* | 5/2018 | Gopal | G06F 9/505 |
| 2018/0373597 | A1* | 12/2018 | Rana | G06F 16/907 |
| 2019/0087115 | A1* | 3/2019 | Li | G06F 16/137 |
| 2019/0121883 | A1* | 4/2019 | Swaminathan | G06F 16/5862 |

\* cited by examiner

*Primary Examiner* — James Trujillo
*Assistant Examiner* — Michal Bogacki
(74) *Attorney, Agent, or Firm* — Chamberlain, Hrdlicka, White, Williams & Aughtry

(57) ABSTRACT

A data storage system includes accelerated storages that store data encoded using a first data integrity scheme. The data storage system also includes a global enumerator that obtains a request to use a second data integrity scheme to store the data; in response to obtaining the request: performs a recoding process for the data including: reading data chunks, corresponding to the data, from the storages; generating new data chunks based on: the read data chunks and the second data integrity scheme; storing the new data chunks in the accelerated storages in an arrangement specified by the second data integrity scheme; and deleting the data chunks after storing the new data chunks.

19 Claims, 20 Drawing Sheets

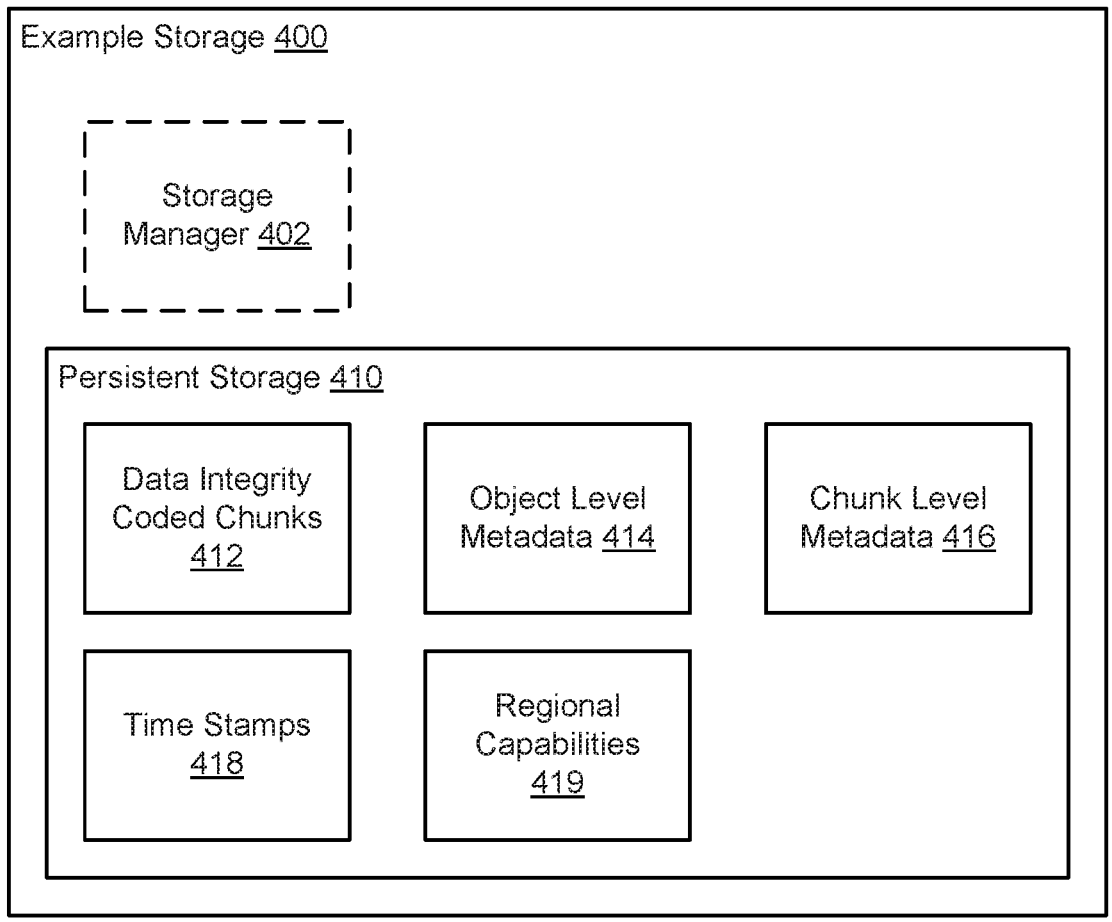
FIG. 4.1
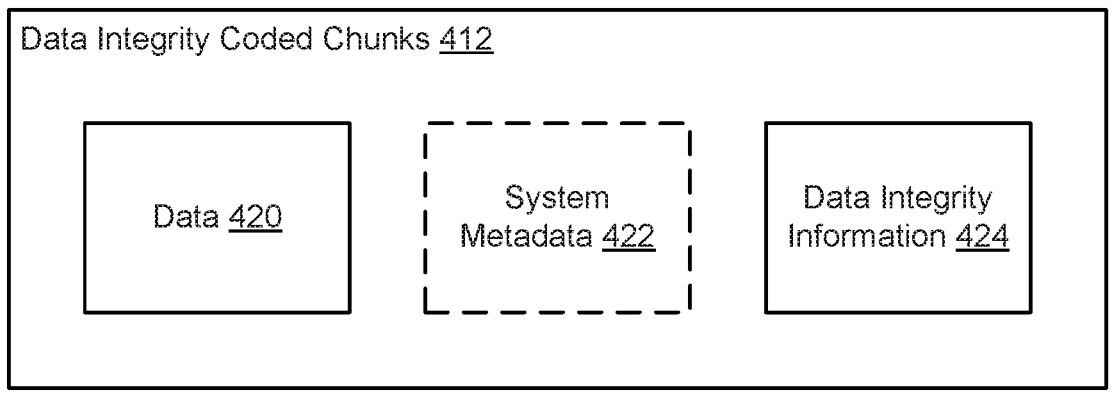
FIG. 4.2

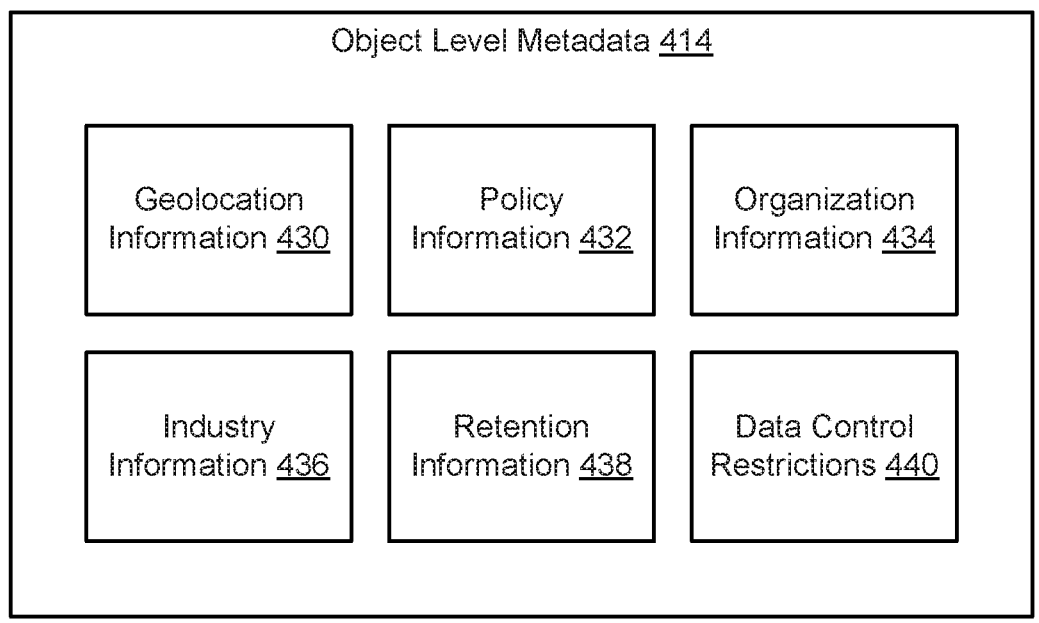
FIG. 4.3

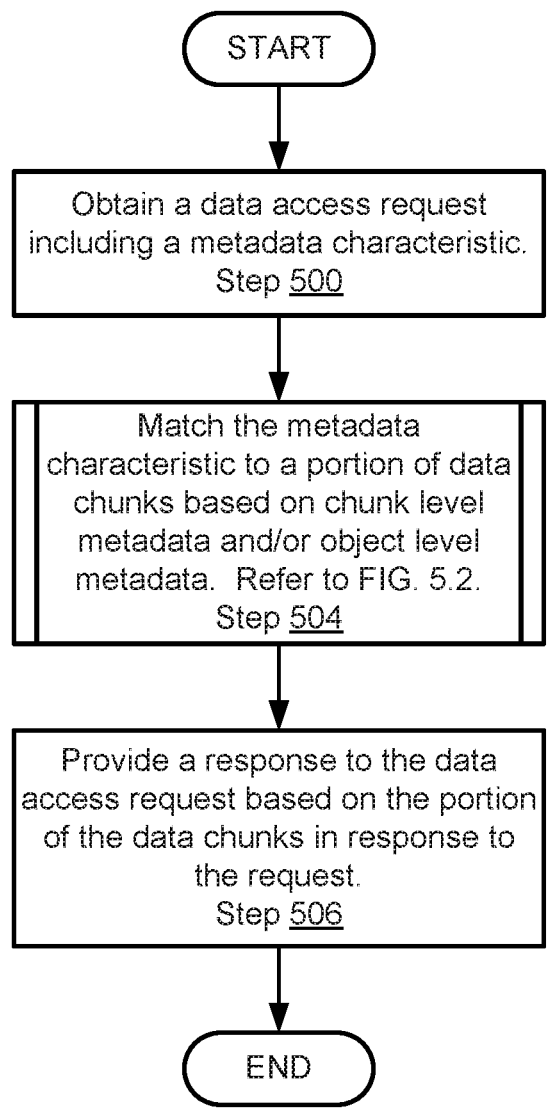
FIG. 5.1

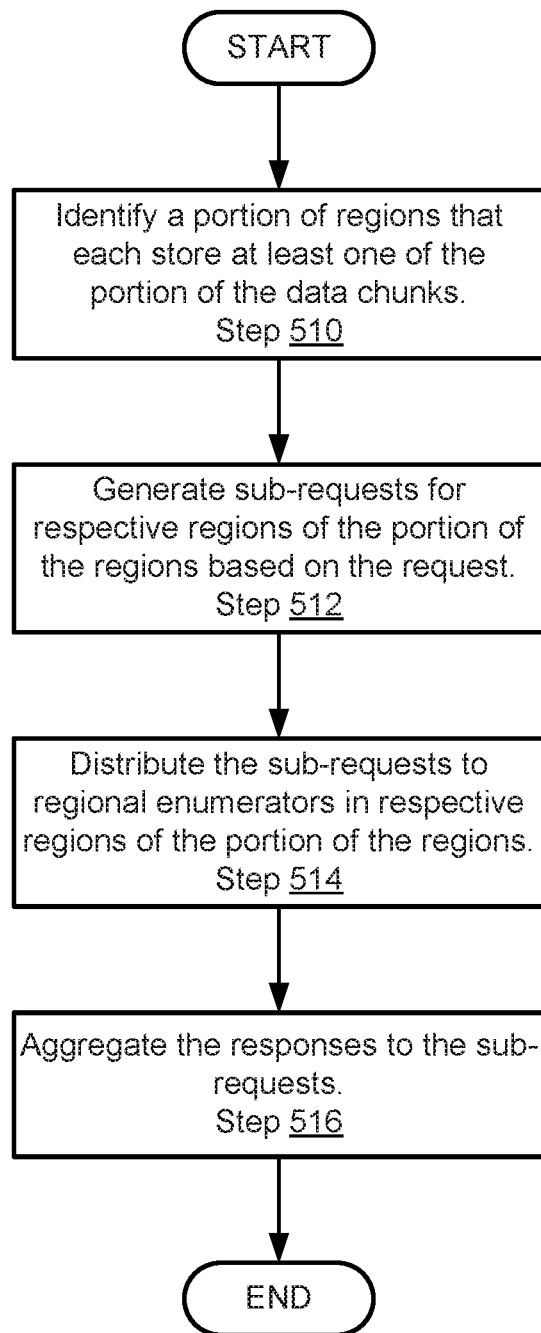
FIG. 5.2

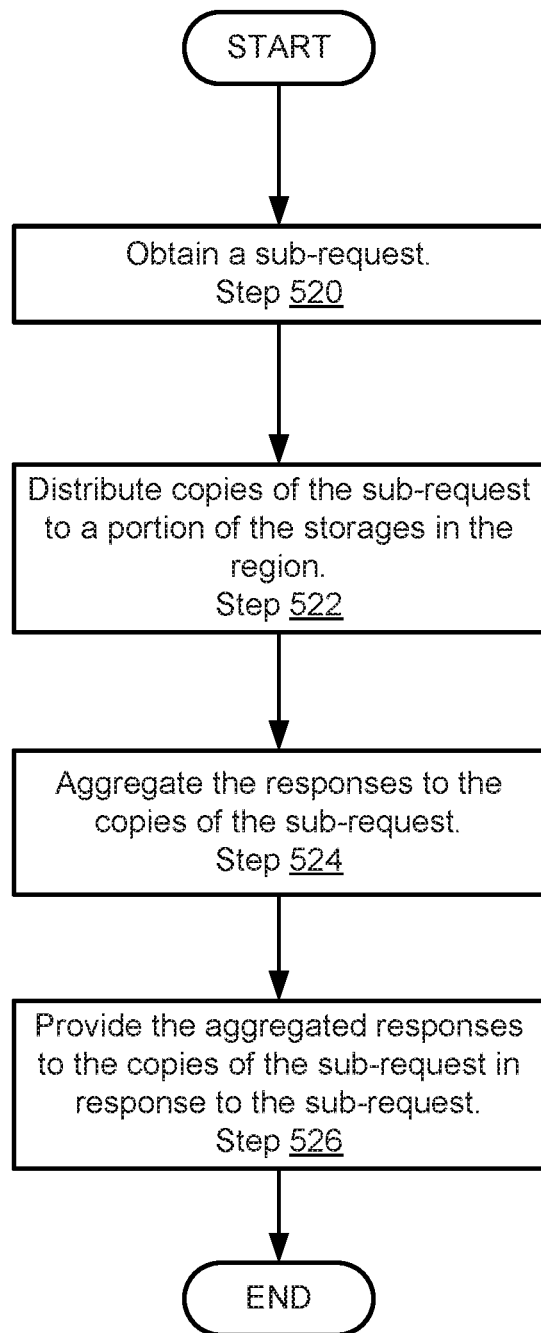
FIG. 5.3

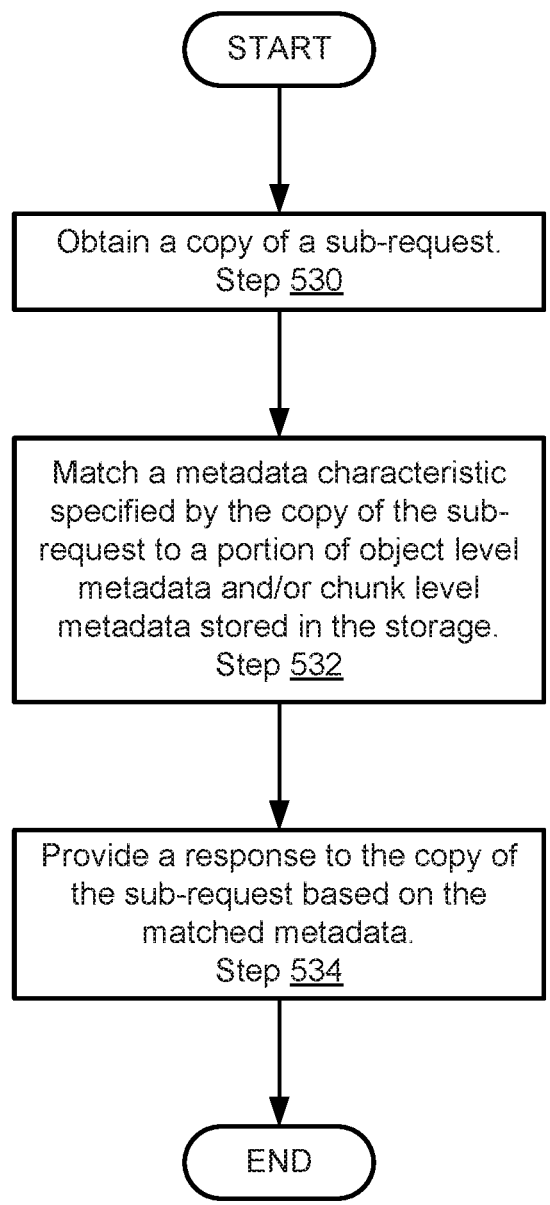
FIG. 5.4

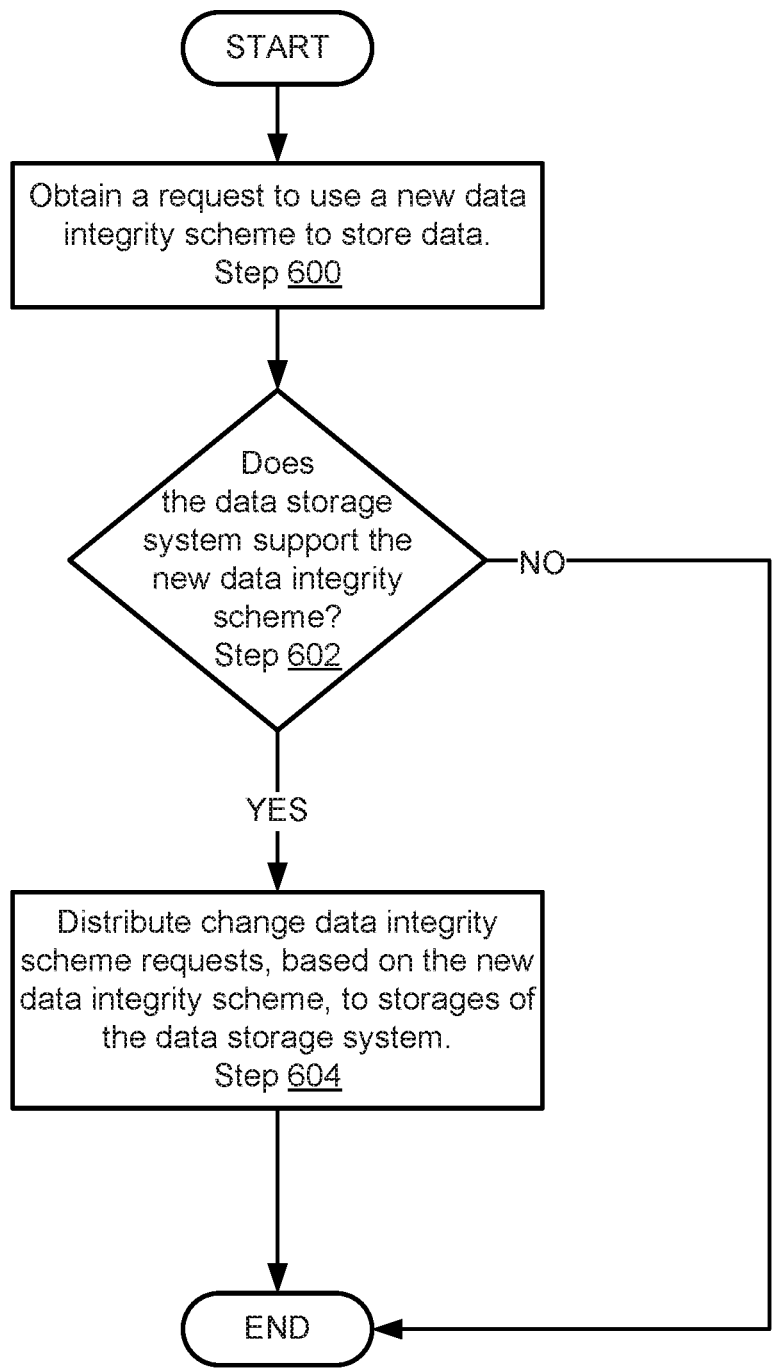
FIG. 6.1

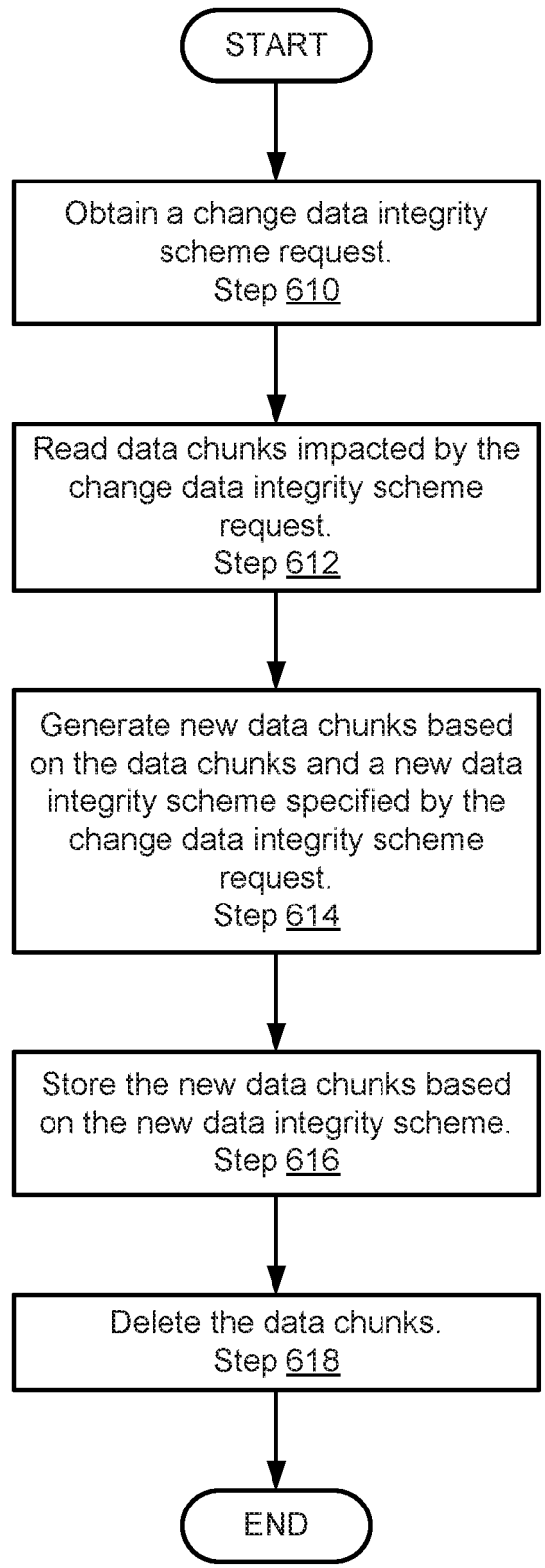
FIG. 6.2

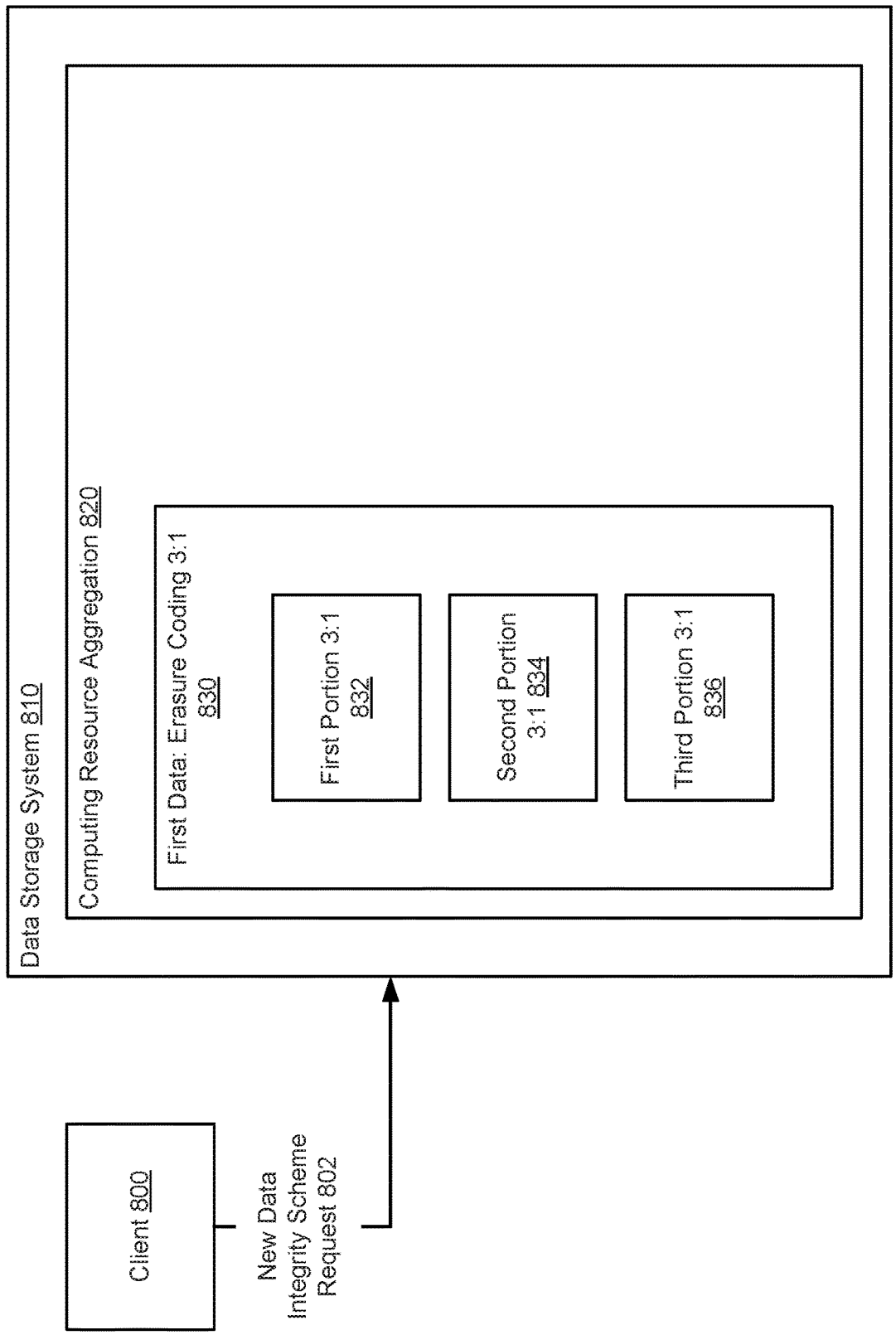
FIG. 8.1

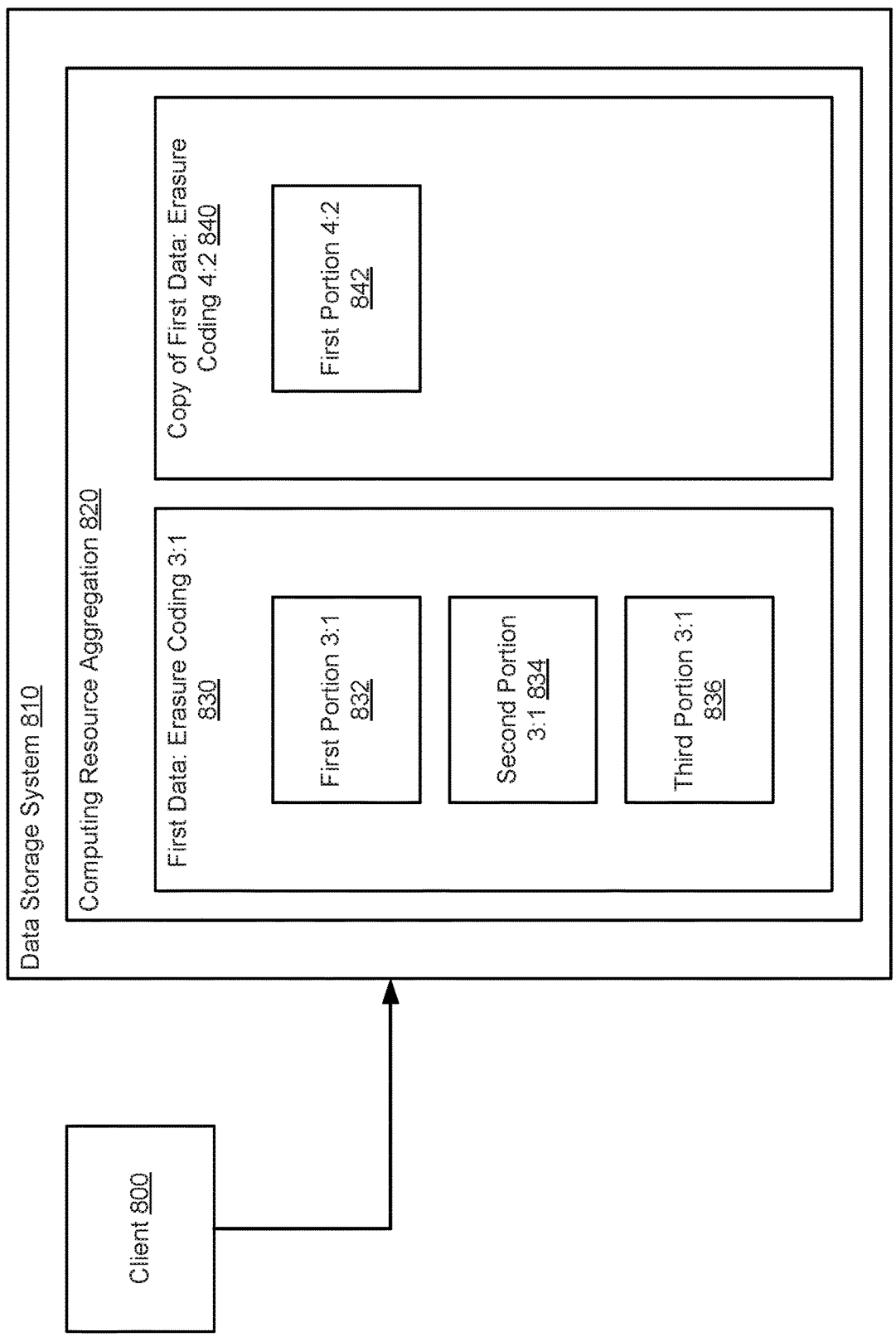
FIG. 8.2

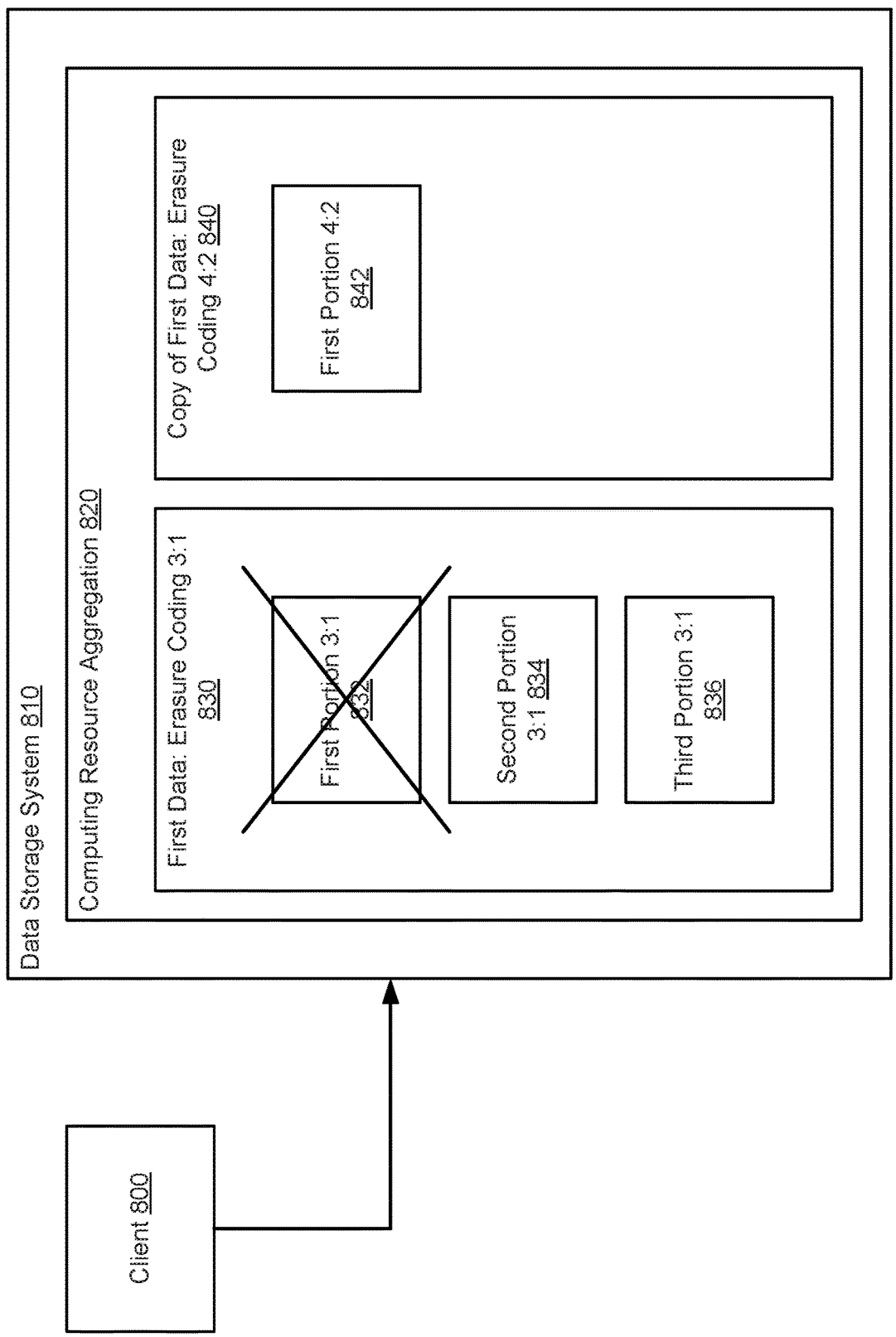
FIG. 8.3

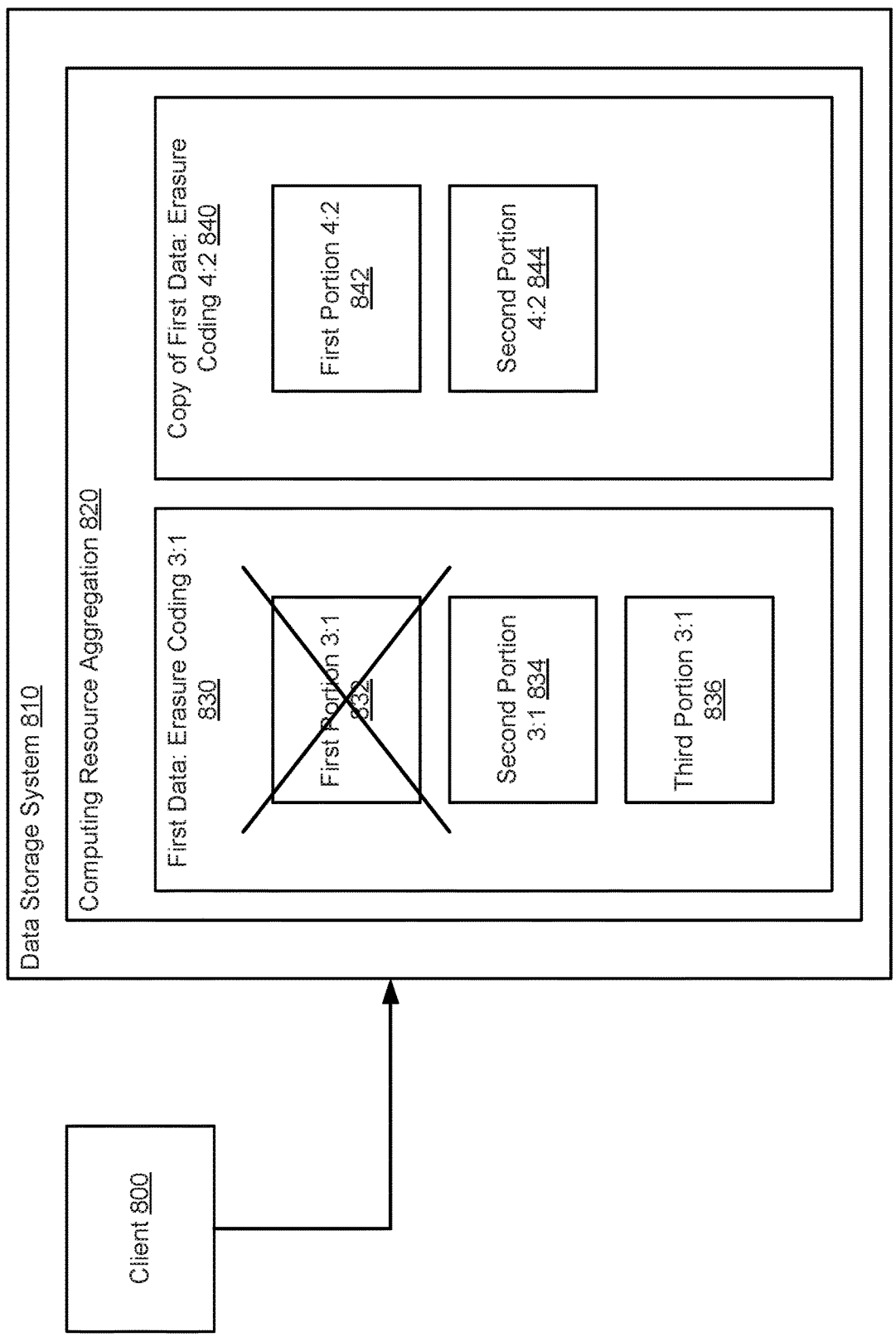
FIG. 8.4

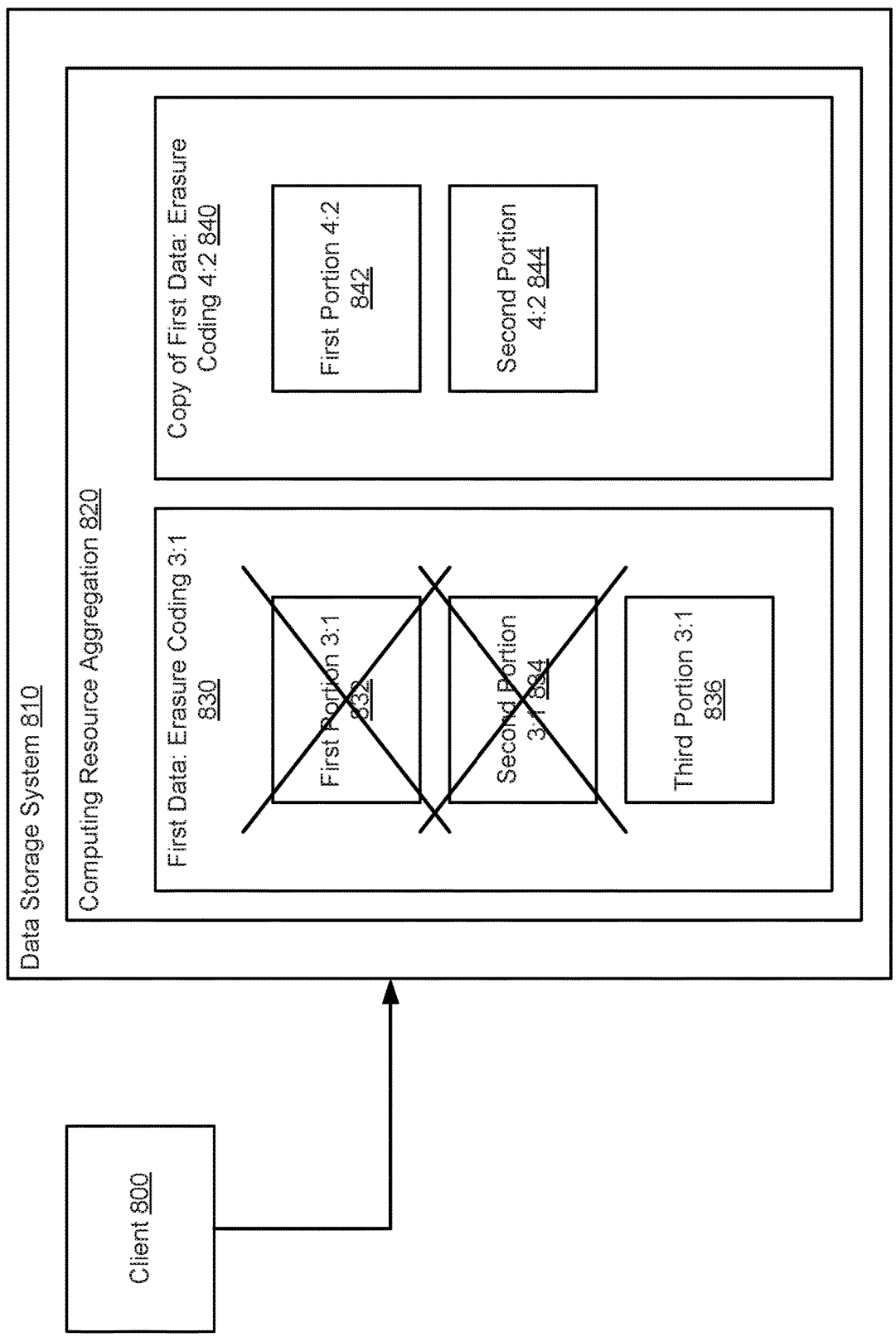
FIG. 8.5

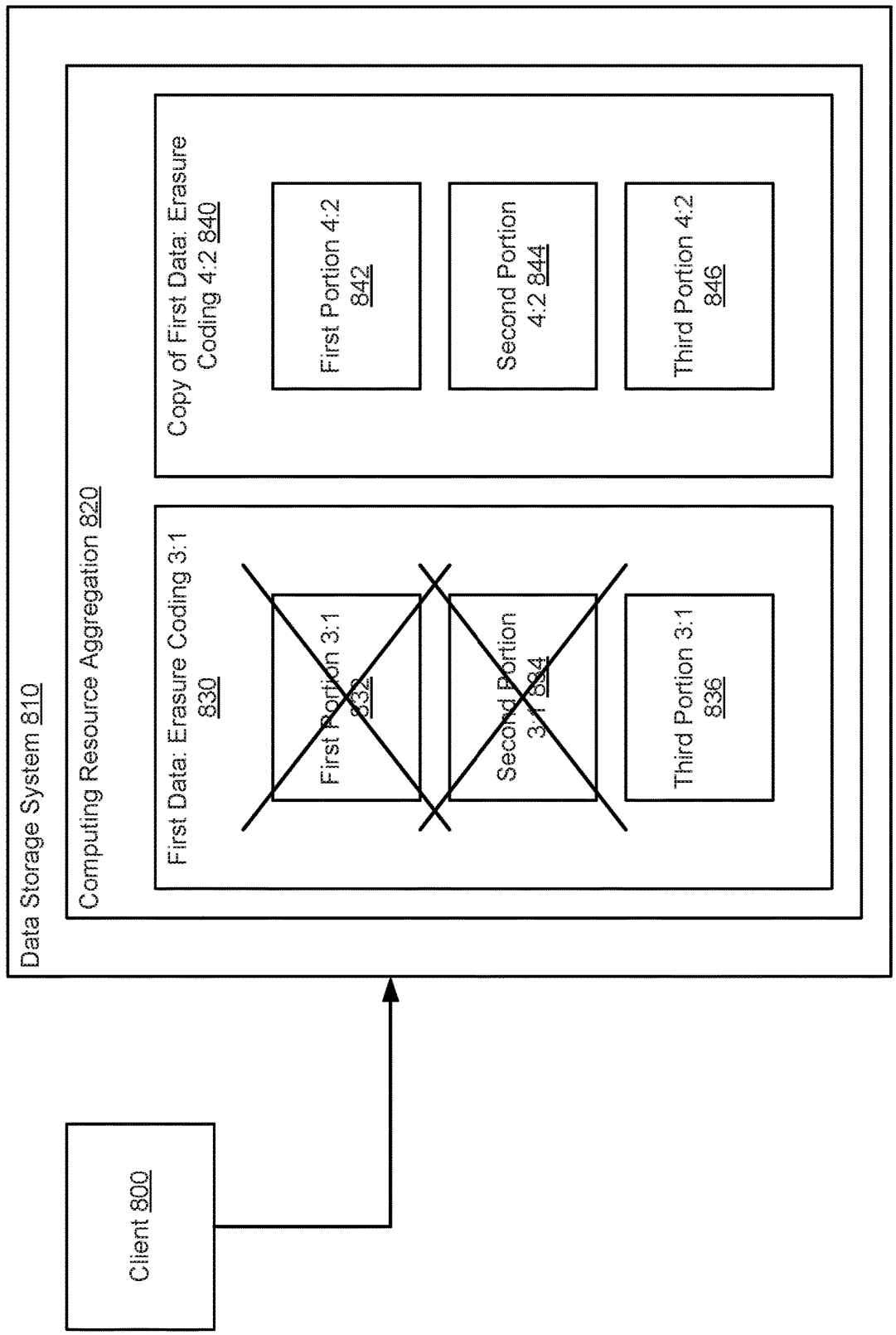
FIG. 8.6

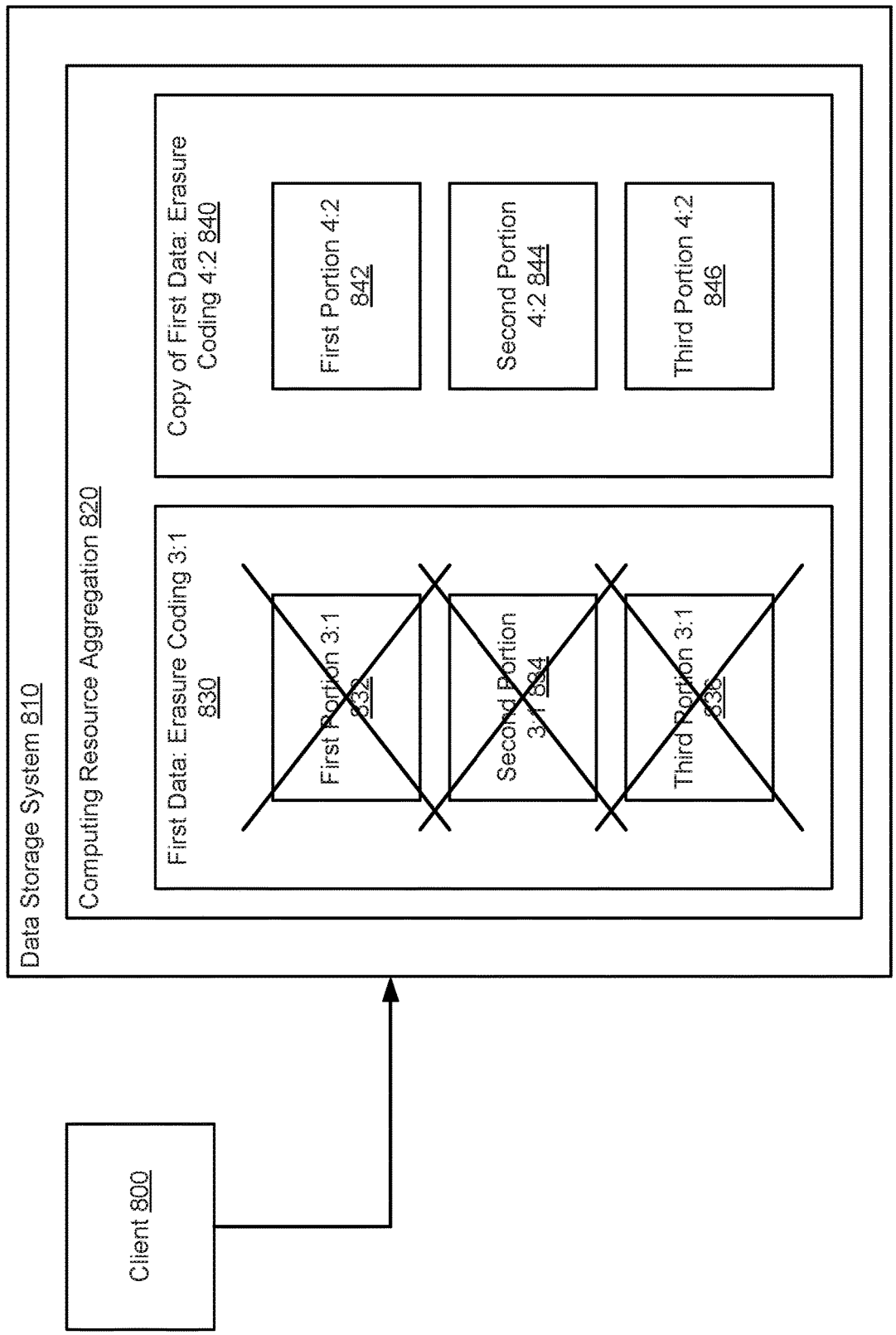
FIG. 8.7

SYSTEM AND METHOD FOR MANAGING DATA USING AN ENUMERATOR

BACKGROUND

Computing devices may generate data during their operation. For example, applications hosted by the computing devices may generate data used by the applications to perform their functions. Such data may be stored in persistent storage of the computing devices. Failure of the persistent storage may result in data loss.

When data is lost, it may be unrecoverable if no copies of the data were made and stored in locations other than the persistent storage. If copies of data are stored in other locations, the data may be separated from an application that utilizes the data. Due to the format of the data, it may be difficult to ascertain the contents of the data without utilizing the application that uses the data.

SUMMARY

In one aspect, a data storage system in accordance with one or more embodiments of the invention includes accelerated storages that store data encoded using a first data integrity scheme; and a global enumerator that obtains a request to use a second data integrity scheme to store the data; in response to obtaining the request: performs a recoding process for the data including: reading data chunks, corresponding to the data, from the storages; generating new data chunks based on: the read data chunks and the second data integrity scheme; storing the new data chunks in the accelerated storages in an arrangement specified by the second data integrity scheme; and deleting the data chunks after storing the new data chunks.

In one aspect, a method for managing a data storage system in accordance with one or more embodiments of the invention includes obtaining a request to use a new data integrity scheme to store data that is stored in accelerated storages using a first data integrity scheme; in response to obtaining the request: performing a recoding process for the data including: reading data chunks, corresponding to the data, from the storages; generating new data chunks based on: the read data chunks and a second data integrity scheme specified by the request; storing the new data chunks in the accelerated storages in an arrangement specified by the second data integrity scheme; and deleting the data chunks after storing the new data chunks.

In one aspect, a non-transitory computer readable medium in accordance with one or more embodiments of the invention includes computer readable program code, which when executed by a computer processor enables the computer processor to perform a method for managing a data storage system, the method includes obtaining a request to use a new data integrity scheme to store data that is stored in accelerated storages using a first data integrity scheme; in response to obtaining the request: performing a recoding process for the data including: reading data chunks, corresponding to the data, from the storages; generating new data chunks based on: the read data chunks and a second data integrity scheme specified by the request; storing the new data chunks in the accelerated storages in an arrangement specified by the second data integrity scheme; and deleting the data chunks after storing the new data chunks.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 4.1 shows a diagram of an example storage in accordance with one or more embodiments of the invention.

FIG. 4.2 shows a diagram of data integrity coded chunks in accordance with one or more embodiments of the invention.

FIG. 4.3 shows a diagram of object level metadata in accordance with one or more embodiments of the invention.

FIG. 5.1 shows a flowchart of a method of servicing an update request in accordance with one or more embodiments of the invention.

FIG. 5.2 shows a flowchart of a method of matching metadata characteristics in accordance with one or more embodiments of the invention.

FIG. 5.3 shows a flowchart of a method of servicing a sub-request in accordance with one or more embodiments of the invention.

FIG. 5.4 shows a flowchart of a method of servicing a copy of a sub-request in accordance with one or more embodiments of the invention.

FIG. 6.1 shows a flowchart of a method of managing change of a data integrity scheme in accordance with one or more embodiments of the invention.

FIG. 6.2 shows a flowchart of a method of servicing a change data integrity scheme request in accordance with one or more embodiments of the invention.

FIGS. 8.1-8.7 show diagrams of an example system at different point in time.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems devices and methods for managing data. Specifically, the system may provide methods of identifying data of interest using object level metadata and/or chunk level metadata associated with data chunks. The metadata may include information that describes or otherwise indicates whether a data chunks may be responsive to a data access request.

Additionally, embodiments of the invention may provide methods for changing the manner in which data is stored by the data storage system. For example, over time it may be desirable to change a data integrity scheme used to store data in the data storage system. To change the data integrity scheme, computing accelerated storage of the data storage system may individually change the manner in which data is encoded for data integrity purposes using object level and/or chunk level metadata. By doing so, the computational load for changing the data integrity scheme may be placed on the storages rather than other components of the data storage system.

Further, embodiments of the invention may provide a method for migrating data stored in the data storage system. Data may be migrated to meet regulations (e.g., jurisdictional laws). To migrate the data, the data storage system may take into account the data integrity scheme used to store the data when selecting a new storage location. By doing so, the data storage system may avoid the computational expense of recoding the data for data integrity purposes.

Figure 1:
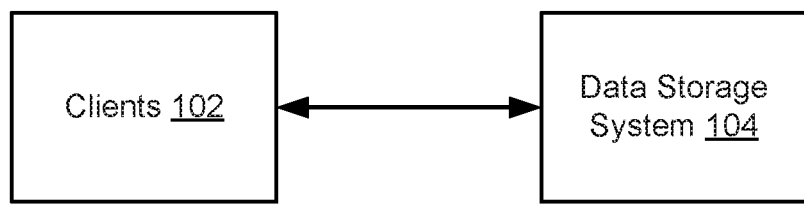
FIG. 1 shows a diagram of a system in time in accordance with one or more embodiments of the invention.

FIG. 1 shows a diagram of an example system in accordance with one or more embodiments of the invention. The system may facilitate the storage and modification of stored data and/or metadata that may impact the manner in which the stored data may be accessed and/or managed. The system may include clients (102) and a data storage system (104).

The clients (102) may utilize data management services provided by the data storage system (104). Utilizing the data management services may include storing data in the data storage system (104), obtaining data (or information regarding stored data) stored in the data storage system (104), and/or modifying how data is stored by the data storage system (104). For example, the clients (102) may change the storage location of data within the data storage system and/or change the manner in which the data is being stored. Such changes may be made, for example, to comply with regulatory requirements or change the quality of storage service (e.g., redundancy) being provided by the data storage system when storing data for the clients.

For example, the clients (102) may utilize the data storage system (104) to store data. Storing the data in the data storage system (104) may, for example, improve redundancy by storing a replica of data, stored in the clients (102), in the data storage system (104), reduce the use of storage resources of the clients (102) by storing data in the data storage system (104) that would otherwise consume the clients' storage resources, or otherwise provide advantages to the clients (102).

Once stored in the data storage system (104), the data storage system (104) may manage the data by replicating the data, treating different replicas of the data differently to meet regulatory requirements, and/or treating different replicas of the data differently to meet other types of goals (e.g., quality of storage service). To manage the data, the data storage system (104) may generate and store metadata that governs how the data is managed, enables computationally efficient searching of the data, and/or provides other types of features with respect to the stored data. By storing different types of metadata associated with different replicas of the data, the system may automatically manage the different replicas of the data differently to meet system level goals.

The components of the system of FIG. 1 may be operably connected to each other (and/or other components) via any combination of wired and/or wireless networks. Each components of the system of FIG. 1 is discussed below.

The clients (102) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 5.1-7. The clients (102) may be implemented using other types of computing devices without departing from the invention. For additional details regarding computing devices, refer to FIG. 9.

The clients (102) may be implemented using logical devices without departing from the invention. For example, the clients (102) may be implemented using virtual machines that utilize computing resources of any number of physical computing devices (e.g., refer to FIG. 9) to provide their respective functionalities. The clients (102) may be implemented using other types of logical devices without departing from the invention.

In one or more embodiments of the invention, the clients (102) provide any number of computer implemented services. The computer implemented services may include, for example, file storage services, database services, electronic communication services, etc. The clients may provide other types of computer implemented services without departing from the invention. Each of the clients (102) may provide similar and/or different computer implemented services.

When providing computer implemented services, the clients (102) may utilize data management services provided by the data storage system (104). Utilizing the data management services provided by the data storage system (104) may include (i) storing data in the data storage system, (ii) obtaining data stored in the data storage system, and/or (iii) modifying storage location and/or manner in which the data is stored. As will be discussed in greater detail below, when the storage location of data and/or the manner in which the data is stored, the clients (102) may utilize an enumerator service provided by the data storage system (104).

To utilize the enumerator service, the clients (102) may send requests to the data storage system (104). The requests may include information that may be used by the data storage system (104) to discriminate a portion of the metadata and/or data that is of interest to the clients (102) from the other metadata and/or data stored in the data storage system (104).

In one or more embodiments of the invention, the information included in the requests matches specific types of information used by the enumerator service provided by the data storage system (104) to discriminate metadata stored in the data storage system (104). By including the specific types of information used by the enumerator service, the metadata stored in the data storage system (104) may be discriminated without needing to (i) crawl the data and/or (ii) use system metadata that was used by a file system (or other organizational structure) of another computing device that provided the data to the data storage system (104) for storage purposes to discriminate the portion of the metadata that is relevant to an update request from all of the metadata stored in the data storage system (104).

The system of FIG. 1 may include any number of clients (102) without departing from the invention.

The data storage system (104) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 5.1-7. The data storage system (104) may be implemented using other types of computing devices without departing from the invention. For additional details regarding computing devices, refer to FIG. 9.

The data storage system (104) may be implemented using logical devices without departing from the invention. For example, the data storage system (104) may be implemented using virtual machines that utilize computing resources of any number of physical computing devices (e.g., refer to FIG. 9) to provide their respective functionalities. The data storage system (104) may be implemented using other types of logical devices without departing from the invention.

In one or more embodiments of the invention, the data storage system (104) provides data management services. Providing data management services may include (i) storing data, (ii) providing stored data, and/or (iii) modifying the storage location and/or manner in which data is stored.

To store data, the data storage system (104) may obtain data, modify the data to improve the likelihood that the data will be accessible in the future, add object level and/or chunk level metadata to the data, and store the modified data, the object level data, and chunk level metadata in storage of the data storage system (104) (and/or in other locations). For example, when the data storage system (104) obtains data for storage, the data storage system (104) may erasure code the data for data integrity purposes and thereby obtain data chunks.

The data storage system (104) may also generate object level metadata that is associated with a portion of the data that includes data of a respective object (e.g., a file used by an organizational system to organize data). The data storage system (104) may further generate chunk level metadata associated with each of the respective chunks. The object level metadata and/or the chunk level the data may include information that enables, for example, the data chunks associated with an object to be retrieved from storage, different portions of the chunks to be discriminated from one another (e.g., enable a level of search functionality), and/or enable different data chunks to otherwise be treated differently for any number of purposes.

To provide the stored data, the data storage system (104) may obtain any number of data chunks corresponding to desired data, reconstitute the desired data using the data chunks, and provide the desired data. For example, data having a particular characteristic may be desirable to an entity. To provide the data, the data storage system (104) may search the object level metadata and/or the chunk level metadata to determine whether the corresponding data chunks have characteristics matching the particular characteristics desired by the entity. Any data chunks matching the aforementioned characteristics may be obtained and used to provide the desired data.

To modify the storage location of data, the data storage system (104) may identify data that is to be stored using object level metadata, as discussed above. Once identified, copies of the data chunks corresponding to the object level metadata may be sent to and/or stored in a new location. Once stored, the data chunks, object level metadata, and/or chunk level metadata may be deleted. In some embodiments of the invention, the object level metadata and/or chunk level metadata may be retained after the data chunks are deleted. Such metadata may be used, for example, to maintain a record of data that has since been deleted from the storage location.

To change the manner in which data is stored, the data storage system (104) may change a data integrity scheme used to store the data. The data integrity scheme may be, for example, erasure coding for a predetermined number of fault domains. The data integrity scheme may be modified for a different number of fault domains. For example, as computing resources are added to or removed from a storage location, the number of fault domains provided by the storage location may change. Consequently, it may be desirable to change the data integrity scheme used to store data over time.

Figure 2:
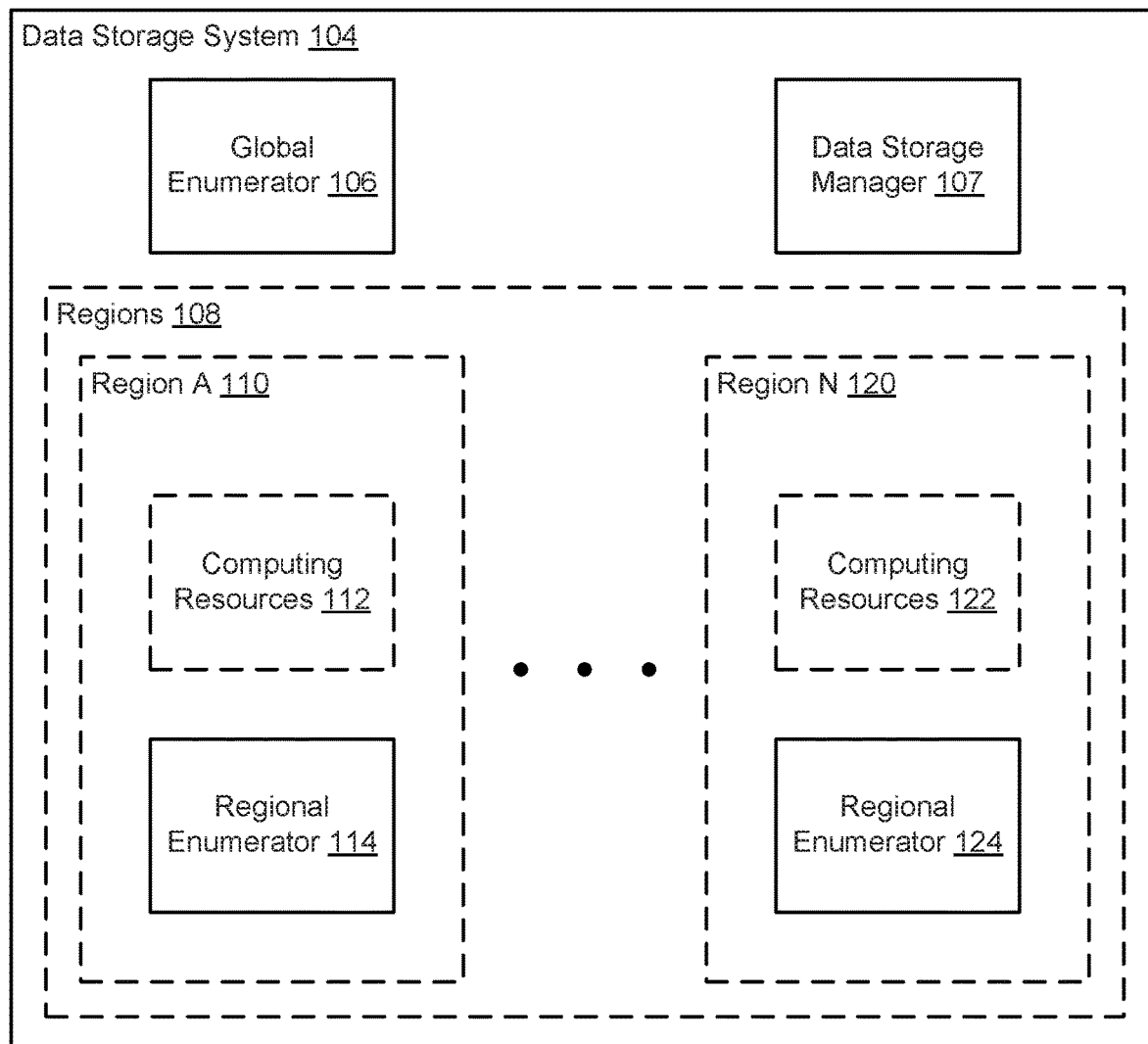
FIG. 2 shows a diagram of a data storage system in accordance with one or more embodiments of the invention.
Figure 3:
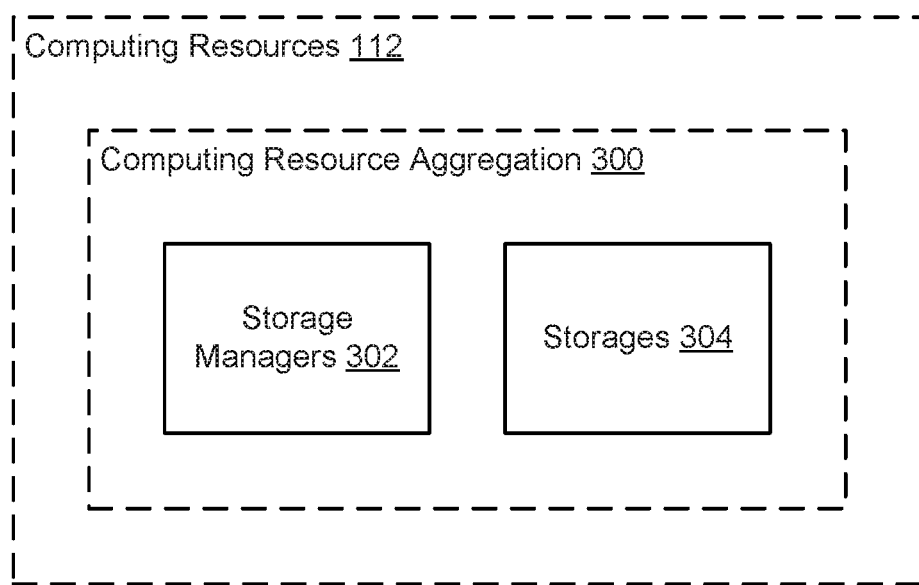
FIG. 3 shows a diagram of computing resources in accordance with one or more embodiments of the invention.

For additional details regarding the data storage system (104), refer to FIGS. 2-4.3.

While the system of FIG. 1 has been illustrated and described as including a limited number of specific components, a system in accordance with one or more embodiments of the invention may include additional, fewer, and/or different components without departing from the invention.

As discussed above, a data storage system in accordance with one or more embodiments of the invention may provide data management services to any number of clients and/or other entities. FIG. 2 shows a diagram of a data storage system (104) in accordance with one or more embodiments of the invention. As discussed above, the data storage system (104) may provide data management services to clients.

To provide data management services to the clients, the data storage system (104) may include a global enumerator (106), a data storage manager (107), and any number of regions (108). Each of these components of the data storage system (104) is discussed below.

The global enumerator (106) may provide search functionality, data retrieval functionality, data migration functionality, and/or data storage scheme modification functionality. For example, the global enumerator (106) may receive requests to migrate data between storage locations or change the storage scheme used to store the data. The global enumerator (106) may service such requests.

To service the requests, the global enumerator (106) may include functionality to search object level metadata and/or chunk level metadata associated with data stored in the data storage system (104). To search the aforementioned metadata, the global enumerator (106) may include functionality to generate sub-requests based on an update request. The sub-request may be a request that has been customized for a particular region of the regions (108). The global enumerator (106) may generate any number of such sub-requests when servicing an update request.

For example, a request obtained by the global enumerator (106) may only implicate metadata stored in a subset of the regions (108). To service the aforementioned request, the global enumerator (106) may only generate sub-requests for each of the implicated regions. Once generated, the global enumerator (106) may send the aforementioned sub-requests to the corresponding regions. By doing so, only regions implicated by requests may receive sub-requests. Consequently, the total computing resources consumed for servicing a request may be reduced when compared to servicing a request by generating and sending sub-requests to all of the regions, even those that are unlikely to include metadata responsive to the request.

To generate such sub-requests, the global enumerator (106) may maintain a cache (not shown) or other type of data structure that includes a portion of the object level metadata and/or chunk level metadata maintained by the regions (108). For example, the global enumerator (106) may maintain a cache of the object level metadata included in each of the regions (108). By doing so, the global enumerator (106) may utilize the data included in the cache to determine which of the regions is likely to include metadata that is responsive to an update request. By doing so, the global enumerator (106) may generate a customized set of sub-requests for each update request (e.g., by identifying a subset of the regions based on copies of metadata included in the cache).

Once the sub-requests are generated, the global enumerator (106) may send the sub-requests to corresponding regions. More specifically, the sub-requests may be sent to regional enumerators in each of the regions. In turn, the regional enumerators may process the obtained sub-requests.

The global enumerator (106) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the global enumerator (106) described in this application and/or all, or a portion, of the methods illustrated in FIGS. 5.1-7. The global enumerator (106) may be implemented using other types of computing devices without departing from the invention. For additional details regarding computing devices, refer to FIG. 9.

The global enumerator (106) may be implemented using logical devices without departing from the invention. For example, the global enumerator (106) may be implemented using virtual machines that utilize computing resources of any number of physical computing devices (e.g., refer to FIG. 9) to provide their respective functionalities. The global enumerator (106) may be implemented using other types of logical devices without departing from the invention.

The data storage manager (107) may provide data storage functionality. For example, the data storage manager (107) may obtain data for storage, encode the data for data reliability purposes (e.g., erasure code), generate object level and/or chunk level metadata, deduplicate the data, and/or store the data and/or the aforementioned metadata. When storing encoded data, the data storage manager (107) may store the data across multiple fault domains in accordance with a data integrity scheme (e.g., erasure coding). The data storage manager (107) may also store the object level metadata and/or chunk level metadata in a searchable repository. By doing so, the regional enumerators (e.g., 114, 124) may service sub-requests by searching the aforementioned metadata rather than the data chunks.

The data storage manager (107) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the data storage manager (107) described in this application and/or all, or a portion, of the methods illustrated in FIGS. 5.1-7. The data storage manager (107) may be implemented using other types of computing devices without departing from the invention. For additional details regarding computing devices, refer to FIG. 9.

The data storage manager (107) may be implemented using logical devices without departing from the invention. For example, the data storage manager (107) may be implemented using virtual machines that utilize computing resources of any number of physical computing devices (e.g., refer to FIG. 9) to provide their respective functionalities. The data storage manager (107) may be implemented using other types of logical devices without departing from the invention.

While the global enumerator (106) and the data storage manager (107) are illustrated as entities separate from the regions (108), the regions (108) may provide the functionality of the global enumerator (106) and the data storage manager (107) without departing from the invention. For example, the regional enumerator in each of the regions may provide the functionality of the global enumerator (106) when a particular region (e.g., 110, 120) obtains a request. The aforementioned regional enumerator may provide the functionality of the global enumerator (106) in addition to its own functionality of the regional enumerator, which will be discussed in greater detail below. Similarly, each of the regions (108) may separately host respective instances of the data storage manager (107) and/or the global enumerator (106).

The regions (108) may be logical groupings of computing resources. The data storage system (104) may include any number of regions. The computing resources of each region may include any number of physical and/or logical computing devices. For details regarding a physical computing device, refer to FIG. 9. The computing resources (e.g., 112, 122) of each of the regions (e.g., 110, 120) may host a regional enumerator (e.g., 114, 124) and may provide data management services. The data management services provided by the computing resources (e.g., 112, 122) of each region may include storing of data, storing of metadata, and modification of stored data and/or metadata. For additional details regarding computing resources, refer to FIG. 3.

As discussed above, the regional enumerators may service sub-requests obtained from the global enumerator (106). To service sub-requests, the regional enumerators (e.g., 114, 124) may obtain the requests, use object level metadata and/or chunk level metadata to identify any number (e.g., none, one, many) of portions of the metadata that are responsive to the requests, and take action to complete the requests. For example, the actions may include (i) identifying relevant data using object level metadata, (ii) providing copies of the identified data, (iii) deleting identified data and/or associated metadata, (iv) modifying metadata associated with the identified data, (v) changing a manner in which data is being stored (e.g., recoding the data for a new type of data integrity scheme), and/or (vi) sending copies of the sub-request to one or more storages in the region for processing.

By modifying the data and/or metadata when performing one or more actions, the regional enumerators may enable the data storage system to comply with, for example, regulations regarding storage of data and/or meet other types of goals with respect to data integrity. Modifying the data and/or the metadata may provide other features without departing from the invention.

The regional enumerators may be implemented using physical and/or logical devices. For example, the regional enumerators may be implemented using computer readable instructions (e.g., program code) that when executed by the computing resources of a region give rise to the functionality of the regional enumerator. In another example, the regional enumerators may be implemented using special purpose hardware devices such as, for example, programmable gate arrays, application specific integrated circuit, or other type of hardware device that provides the functionality of the regional enumerators by including circuitry adapted to provide the aforementioned functionality. In a still further example, the regional enumerators may be implemented using a combination of computer readable instructions (e.g., program code) and special purpose hardware devices that cooperatively provide the functionality of the regional enumerators.

In some embodiments of the invention, the different regions of the regions (108) may correspond to logical groupings of computing resources that are disposed in different geographic regions. The geographic regions may, for example, correspond to different countries that place different data control restrictions on the storage and/or transmission of different types of data. Consequently, the computing resources disposed in each of the different regions (e.g., 110, 120) may be subject to different data control restrictions. Data control restrictions may be, for example, limits on how data may be modified, transferred, or otherwise utilized. For example, personal information may be regulated in Europe under the general data protection regulation which provides for civil penalties regarding specific uses of personal information.

For example, consider a scenario in which the computing resources (112) of region A (110) may be disposed in the United States while the computing resources (122) of region N (120) may be disposed in Europe. Each of these geographic regions has different data control restrictions imposed by the local governments. Consequently, the governmental regulations that apply to data stored in the computing resources (112) of region A (110) may be different from those that apply to the data stored in the computing resources (122) of region N (120).

While the data storage system (104) has been described and illustrated as including a limited number of specific components, a data storage system (104) in accordance with embodiments of the invention may include additional, fewer, and/or different components.

As discussed above, a region (e.g., 110, 120) may be a logical grouping of computing resources. The grouping may correspond to a geographic and/or regulatory boundary (e.g., all of the computing resources of a region may be subject to the same data control restrictions). FIG. 3 shows a diagram of computing resources (112) in accordance with one or more embodiments of the invention.

The computing resources (112) of a region may include any number of computing resource aggregations (e.g., 300) as illustrated in FIG. 3. A computing resource aggregation (300) in accordance with one or more embodiments of the invention may include any quantity of physical and/or logical computing resources.

For example, a computing resource aggregation (300) may be implemented as a computing cluster, a cloud resource (e.g., a logical entity that utilizes any quantity of computing resources of any number of physical computing devices), a hyperconverged architecture, a server farm, or any other type of grouping of computing resources. The physical and/or logical computing resources of the computing resource aggregation (300) may be adapted to provide the functionality of the computing resource aggregation (300). To be adapted to provide the functionality of the computing resource aggregation (300), the physical computing resources of the computing resource aggregation (300) may execute computer instructions (e.g., computer code) that cause processing devices of the computing resource aggregation (300) to provide all, or a portion, of the functionality of the computing resource aggregation (300), the physical computing resources may include dedicated circuitry that provides all, or a portion, of the functionality of the computing resource aggregation (300), and/or include/host other types of physical and/or logical entities that provide the functionality of the computing resource aggregation (300).

The computing resource aggregation (300) may provide data storage services. The data storage may include storing data, metadata, and providing copies of stored data and metadata. To provide the functionality of the computing resource aggregation (300), the computing resource aggregation (300) may include one or more storage manager (302) and one or more storages (304). Each of the aforementioned components of the computing resources aggregation (300) is discussed below.

The storage managers (302) may manage storing of data in storage resources of the computing resource aggregation (300) and providing copies of data stored in the storage resources. For example, the storage managers (302) may store data in the storages (304) and provide data stored in the storages (304) in response to requests from regional enumerators and/or other entities.

Additionally, the storage managers (302) may include functionality to recode stored data in accordance with a new data integrity scheme. For example, the storage managers (302) may include functionality to recode stored data using different erasure coding schemes (e.g., different numbers of fault domains/level of redundancy).

The storage managers (302) may include functionality to generate data chunks, object level metadata, and/or chunk level metadata, as discussed above. To generate the data chunks, the storage managers (302) include functionality to encode data for data integrity purposes. For example, the storage managers (302) may include functionality to generate erasure coded data that includes any number of data and parity chunks.

The storage managers (302) may include functionality to implement any number of erasure coding algorithms. The erasure coding algorithms implemented by the storage managers (302) may generate erasure coded data (e.g., data integrity coded chunks) corresponding to any erasure coding scheme (e.g., 3:1, 4:2, etc.). The storage managers (302) may include functionality to store the aforementioned data chunks across any number of fault domains for data integrity purposes.

Additionally, the storage managers (302) may include functionality to regenerate data in accordance with any number of erasure coding schemes (or other type of data integrity schemes). For example, the storage managers (302) may be capable of responding to failures of one or more of the storages (304) by regenerating any portion of the data stored in the failed one or more of the storages (304) in accordance with data integrity schemes employed by the storage managers (302).

For example, consider a scenario in which data chunks are erasure coded in a 3:1 manner and stored across four of the storages (304). In response to a failure of one of the four storages, the storage managers (302) may regenerate the data using the remaining data. Once regenerated, the regenerated data may be stored in another one of the storages (304) (and/or in another computing resource aggregation).

In addition to erasure coding data for data integrity purposes, the storage managers (302) may implement any number of other data integrity algorithms and/or data storage efficiency algorithms such as, for example, mirroring and deduplication. To provide their functionality, the storage managers (302) may perform all, or a portion, of the methods illustrated in FIGS. 5.1-7.

The storage managers (302) may also store any number of copies of object level metadata and/or chunk level metadata. For example, the storage managers (302) may store copies of the aforementioned metadata data in persistent storage (e.g., the storages (304)) and/or memory (i.e., an in-memory data structure).

The storage managers (302) may be implemented using any combination of physical and/or logical devices. For example, the storage managers (302) may be implemented using computer readable instructions (e.g., program code) that when executed by the computing resources of the computing resource aggregation (300) give rise to the functionality of the storage managers (302). In another example, the storage managers (302) may be implemented using special purpose hardware devices such as, for example, programmable gate arrays, application specific integrated circuit, or other type of hardware device that provides the functionality of the storage managers (302) by including circuitry adapted to provide the aforementioned functionality. In a still further example, the storage managers (302) may be implemented using a combination of computer readable instructions (e.g., program code) and special purpose hardware devices.

While the storage managers (302) are illustrated in FIG. 3 as being separate devices from that of the storages (304), the functionality of the storage managers (302) may be performed by the storages (304) without departing from the invention.

The computing resource aggregation (300) may include any number of storage managers (302). For example, the computing resource aggregation (300) may include more storages (304) than storage managers (302) (e.g., a storage manager utilizes the storage resources of multiple storages) or the same number of storage managers (302) as storages (304) (e.g., each storage manager utilizes only the storage resources of a corresponding storage). In some embodiments of the invention, two storages may utilize the storage resources of a single storage (e.g., different portions of the storage resources of the storage are utilized by different storage managers). In some embodiments of the invention, two storages may share a portion of the storage resources of a single storage (e.g., a shared storage resource).

The storages (304) may be implemented using physical and/or logical devices that provide storage resources that may be utilized by the storage managers (302) and/or other entities. For example, the storages (304) may be implemented using physical (e.g., hard disk drives, solid state drives, etc.) and/or logical storages (e.g., virtual disks). By proving storage resources to the storage managers (302), the storage managers (302) may be able to store data using the storage resources and provide copies of stored data using the storage resources.

In one or more embodiments of the invention, all, or a portion, of the storage (304) are implemented as computing accelerated storage devices. A computing accelerated storage device may be a storage device that includes the ability to execute algorithms (e.g., includes processing/memory resources to execute computer instructions and/or includes a hardware device that includes dedicated circuitry that provides the functionality of the algorithms) to facilitate storing of data in persistent storage of the computing accelerated storage device. For example, a computing accelerated storage device may include processing resources, memory resources, and may store computer instructions that when executing using the processing resources and/or memory resources causes the computing accelerated storage device to perform one or more algorithms. The one or more algorithms may correspond to all, or a portion, of the functionality of the storage managers (302).

Implementing the storages (304) using computing accelerated storage devices may enable the computing resource aggregation (300) to perform distributed algorithms, at the storage level, in a coordinated manner to provide its functionality. Doing so may free the computing resources of devices hosting the storages (304) to perform other types of functionality of the computing resource aggregation (300). For example, a computing device of the computing resource aggregation (300) may include both a processor and a computing accelerated storage. The computing accelerated storage may provide a portion of the functionality of the computing device (i.e., implementing storage algorithms) without utilizing processing resources of the processor or other types of hardware devices of the computing device.

Each of the storages (304) may provide their functionality asynchronously from each other. For example, multiple storages (304) may be instructed by a regional enumerator to perform one or more tasks. However, the multiple storages may take action in response to being instructed by a regional enumerator at different points in time depending on the current workload of each of the respective storages.

While the computing resources (112) have been described as including a limited number of specific components, the computing resources (112) may include additional, different, and/or fewer components without departing from the invention.

As discussed above, a data storage system in accordance with embodiments of the invention may store data in a format (i.e., a data structure) that enables stored data and metadata to be searched for particular characteristics without resorting to crawling the stored data, which may be computationally expensive. To further clarify aspects of the format of stored data and metadata in accordance with embodiments of the invention, FIGS. 4.1-4.3 show a diagram of an example storage (400) that stores data in a particular format and diagrams of data structures that may be used by the example storage (400), respectively. All or a portion of the storages of a computing resource aggregation in accordance with embodiments of the invention may be similar to the example storage (400) shown in FIG. 4.1.

FIG. 4.1 shows a diagram of an example storage (400) in accordance with embodiments of the invention. The example storage (400) may be similar to the storages (304) illustrated in FIG. 3. As discussed with respect to the storages (304) of FIG. 3, the example storage (400) may provide all, or a portion, of the functionality of a storage manager (402) corresponding to one of the storage managers illustrated in FIG. 3.

The storage manager (402) (illustrated with a dashed outline to indicate that the example storage (400) may not include a storage manager) may include functionality to perform any number of algorithms related to storing data and metadata in persistent storage (410) of the example storage (400) and providing data and metadata stored in the persistent storage (410). For example, the storage manager (402) may include functionality to store data in an erasure coded format (or other type of data integrity storage format), deduplicate data before storing it, search/generate object level metadata and/or chunk level metadata, modify an erasure coding format of stored data, store data in other storages (e.g., to meet fault domain or other restrictions related to data integrity schemes employed for data storage purposes), and/or other functionalities.

In one or more embodiments of the invention, the storage manager (402) may store data in an auditable format. For example, when object level metadata associated with any number of data chunks indicates that an audit trail is to be generated, the storage manager (402) may store changes to data rather than modifying data when modifications to the data chunks are made. For example, the storage manager (402) may generate a new data chunk when a modification to a data chunk is made. The new data chunk may reflect the changes to the data chunk upon which the new data chunk is based. A time stamp (e.g., 418) for the new data chunk may also be stored to enable a trail of changes to data chunks over time to be recorded. Consequently, any number of data chunks associated with different points in time by corresponding time stamps (418) may be stored when modifications to a particular data chunk is made.

The storage manager (402) may determine when to store data (and/or modify data stored date) in a manner to generate an audit trail when object level metadata and/or chunk level metadata indicates that an audit trail should be generated. For example, the aforementioned data may include a flag, or another type of indicator, that is used by the storage manager (402) to determine whether to store/modify data in an auditable format or whether not to store/modify data in an auditable format.

The storage manager (402) may also provide data migration services. For example, when data is stored in a particular storage, the data may be allowed to be stored there in accordance with jurisdictional rules that govern storage of data. However, over time the aforementioned rules may change. To facilitate compliance with jurisdictional rules, the storage manager (402) may migrate data stored in the persistent storage (410) to other storage locations (e.g., storages in other regions). To facilitate data migration, the storage manager (402) may identify characteristics of the to be migrated data and compare those characteristics to regional capabilities (419) of different regions to identify a region in which it may be advantageous to store the data. For example, the computational cost for storing the to be migrated data in each region may be determined by the storage manager (402) based on the characteristics of the data and the regional capabilities (419). A region for storing the to be migrated data may be selected based on the aforementioned determination.

When providing its functionality, the storage manager (402) may generate, store, and/or utilize previously stored data integrity coded chunks (412), object level metadata (414), chunk level metadata (416), and/or regional capabilities (419) stored in persistent storage (e.g., 410).

To store data, the example storage (400) may include persistent storage (410). The persistent storage (410) may provide storage resources. To provide storage resources, the persistent storage (410) may include any number of physical devices for storing data. For example, the persistent storage (410) may include hard disk drives, solid state drives, tape drives, or any other type of physical storage devices that provides non-transitory storage resources. The persistent storage (410) may also include transitory storage resources such as, for example, memory for temporarily storing data until the data is able to be stored in non-transitory storage resources.

The persistent storage (410) may store data integrity coded chunks (412), object level metadata (414), chunk level metadata (416), time stamps (418), and/or data region capabilities (419). Each of these data structures is discussed below.

The data integrity coded chunks (412) may be data structures that include information reflecting data (420), system metadata (422), and/or data integrity information (424), as illustrated in FIG. 4.2. The data integrity coded chunks (412) may include any number of data chunks. Each data chunk may correspond to a portion of data generated by a data integrity scheme such as, for example, erasure coding or other type of scheme. For example, any number of data chunks may be generated when an erasure coding algorithm is performed on any quantity of data. The quantity of data may include data (420) from a system (e.g., file system or other type of data organization scheme) and/or system metadata (422). When performing the algorithm, data integrity information (424) may be generated. The data integrity information (424) may be, for example, parity chunks that enable a portion of the chunks to be regenerated when the chunks are lost due to, for example, failure of a persistent storage.

In one or more embodiments of the invention, multiple versions of a particular data chunk are included in the data integrity coded chunks (412). As noted above, embodiments of the invention may provide a method for generating an audit trail. An audit trail may be a collection of copies of a particular data chunk over time. In other words, the audit trail may include any number of copies of the data chunk that are associated with different portions in time (e.g., after changes to the particular data chunk have been made). Each of the copies of the data chunk may include different information (and/or duplicative information included in other data chunks of the audit trail).

Returning to FIG. 4.1, the object level metadata (414) may be a data structure that includes metadata associated with any number of the data chunks of the data integrity coded chunks (412). For example, a portion of the object level metadata (414) may correspond to a number of the data chunks that include information regarding a particular object (e.g., a file). The portion of the object level metadata (414) may include, for example, an identifier of an object (e.g., a file name), characteristics of the object, identifiers of data chunks of the data integrity coded chunks (412) corresponding to the object, and other types of information associated with the object. The object level metadata (414) may include any number of portions that correspond to any number of objects associated with respective portions of the chunks of the data integrity coded chunks (412). For additional information regarding object level metadata (414), refer to FIG. 4.3.

The chunk level metadata (416) may be a data structure that includes metadata associated with corresponding chunks of the data integrity coded chunks (412). For example, a portion of the chunk level metadata (416) may correspond to a single data chunk of the data chunks of the data integrity coded chunks (412). The portion of the chunk level metadata (416) may include, for example, an identifier of the single data chunk, access information for the single data chunk (e.g., an identifier of a storage that stores the single chunk, an identifier of a computing resource aggregation that includes the storage, an identifier of a region that includes the computing resource aggregation, etc.), and/or classification information regarding the single data chunk. The classification information may include, for example, information regarding the single data chunk such as, for example, whether the single chunk includes information that may be restricted due to jurisdictional regulations (e.g., personal information), access restrictions with respect to the single data chunk, and/or other types of information regarding the single data chunk. The chunk level metadata (416) may include any number of portions that correspond to any number of data chunks. Each of the corresponding data chunks may be stored in the example storage (400) and/or in other storages.

The time stamps (418) may be data structures that specify different points in time that are associated with corresponding data integrity coded chunks (412). The time stamps (418) may specify points in time at which a particular data chunk was modified. The data integrity coded chunk corresponding to a time stamp may represent the state of the particular data chunk. Thus, the time stamps (418) and a portion of the data integrity coded chunks (412) may be used to track changes to a data chunk over time. In this manner, prior versions of data chunks may be accessed.

The regional capabilities (419) may be a data structure that includes information regarding (i) how data is being stored in each region (e.g., a data integrity schemes employed by the computing resource aggregations of the regions), (ii) location information of each of the regions, and/or (iii) data regulation information regarding each of the regions. For example, the regional capabilities (419) may specify erasure coding schemes employed by each computing resource aggregation, the country in which each computing resource aggregation is located, and the types of data that are subject to regulation where each computing resource aggregation is located and/or information regarding the regulations.

While the example storage (400) has been described as including a limited number of specific components, an example storage (400) in accordance with embodiments of the invention may include additional, fewer, and/or different components without departing from the invention. Further, while the data structures illustrated in FIGS. 4.1-4.2 have been described as being separate and including a limited amount of specific information, the aforementioned data structure may include additional, different, and/or less information, may be stored in other locations, may be distributed across any number of devices, and may be subdivided into any number of data structures stored in any number of locations without departing from the invention. Any of the aforementioned data structures may be implemented as, for example, lists, tables, linked lists, databases, etc.

As discussed above, object level metadata may include information regarding an object, information used to manage the data chunks corresponding to the object, and/or other types of information. FIG. 4.3 shows a diagram of object level metadata (414) in accordance with one or more embodiments of the invention. The object level metadata (414) may include geolocation information (430), policy information (432), organization information (434), industry information (436), retention information (438), and/or data control restrictions (440). Each of these components of the object level metadata (414) is discussed below.

The geolocation information (430) may specify geographic information associated with one or more objects. For example, the geolocation information (430) may specify a geographic region in which an object resides (i.e., where the storages are located that store the data chunks associated with an object), governmental regulations on the object (e.g., if the object is subject to regulations such as the general data protection regulation), and/or other types of geographic information associated with the object.

The policy information (432) may specify information regarding data management policies associated with one or more objects. For example, the policy information (432) may specify where the object is to be stored (i.e., storages, regions, etc.) over time, a level of redundancy for storing of the object, a data integrity scheme that is to be used to store the object, and/or other types of information used to store the object.

The organization information (434) may specify information regarding an organization that has rights in one or more objects. For example, the organization information (434) may specify organizations that are the owners of one or more of the object, have access rights to one or more of the objects, or any other types of rights that organizations may have with respect to objects.

The industry information (436) may specify information regarding types of industries associated with owners of objects. For example, the industry information (436) may specify whether governmental regulations associated with different industries may restrict or otherwise require objects to be handled in a prescribed manner. For example, medical data may be subject to different types of compliance standards than customer sales records.

The retention information (438) may specify retention plans for one or more of the objects. The retention plans may specify when, how, and under what conditions the objects may be deleted. For example, a retention plan may specify that a particular object is to be retained in storage for one year and may be deleted after the one year period.

The data control restrictions (440) may specify how data chunks associated with respective objects are to be handled. For example, the data control restrictions (440) may specify whether data may be deleted, modified, or read. In another example, the data control restrictions (440) may specify whether an audit trail is to be maintained. In a still further example, the data control restrictions (440) may specify whether particular users are authorized to access, modify, and/or delete the data chunks associated with a respective object.

While the object level metadata (414) has been illustrated and described as including a limited amount of specific information, object level metadata (414) in accordance with embodiments of the invention may include additional, different, and/or less information without departing from the invention.

Returning to FIG. 1, the data storage system (104) may provide data management services for clients and/or other entities. FIGS. 5.1-7 illustrates methods that may be performed by the data storage system (104) of the system of FIG. 1 when providing data management services.

FIG. 5.1 shows a flowchart of a method in accordance with one or more embodiments of the invention. The method depicted in FIG. 5.1 may be used to service data access requests in accordance with one or more embodiments of the invention. The method shown in FIG. 5.1 may be performed by, for example, a data storage system (e.g., 104, FIG. 1.1). Other components of the system illustrated in FIG. 1 may perform all, or a portion, of the method of FIG. 5.1 without departing from the invention.

While FIG. 5.1 is illustrated as a series of steps, any of the steps may be omitted, performed in a different order, additional steps may be included, and/or any or all of the steps may be performed in a parallel and/or partially overlapping manner without departing from the invention.

In step 500, a data access request is obtained. The data access request includes a metadata characteristic.

In one or more embodiments of the invention, the data access request is obtained by a global enumerator. The data access request may be obtained by receiving the request in a message from a client or another type of entity.

In one or more embodiments of the invention, the data access request is a request for accessing data stored by the data storage system. For example, the data access request may be a request for all data matching the metadata characteristic included in the data access request.

In one or more embodiments of the invention, the metadata characteristic specifies the characteristic of metadata. The characteristic of the metadata may match one or more portions of object level metadata and/or chunk level metadata.

For example, the metadata characteristic may specify the computing resource aggregation. In other words, the data access request may be a request for accessing a portion of data stored in the computing resource aggregation.

In one or more embodiments of the invention, the metadata characteristic is multi-dimensional. In other words, the metadata characteristic specifies multiple characteristics. For example, the metadata characteristic may be all data stored in a particular computing resource aggregation that is of a particular classification (e.g., data associated with a particular person).

In one or more embodiments of the invention, the data access request is generated by the global enumerator. For example, when the global enumerator performs all, or a portion, of the methods illustrated in FIGS. 6-7, the global enumerator may generate such data access requests.

In step 504, the metadata characteristic is matched to a portion of data chunks based on chunk level metadata and/or object level metadata.

In one or more embodiments of the invention, the metadata characteristic is matched by comparing the metadata characteristic to the chunk level metadata and/or the object level metadata. A match may be determined based on the comparison.

The portion of the data chunks may include any quantity of data chunks. The data chunks may be, for example, data integrity coded chunks (e.g., 412, FIG. 4.1). The portion of the data chunks may, for example, include no chunks, one chunk, two chunks, etc. In other words, the match may indicate that no or any number of chunks are associated with the meta data characteristic.

In one or more embodiments of the invention, the matching is performed by distributing any number of sub-requests to any number of regions of the data storage system. For example, when the data access request is obtained by the global enumerator, a number of sub-requests may be generated based on the data access requests. Each of the sub-requests may be customized for each of the regions. By doing so, sub-requests that consume fewer computing resources than would be required to process the data access request in each region may be distributed to the regions for processing. Consequently, the availability of computing resources in the data storage system may be improved.

In one or more embodiments of the invention, the match is performed via the method illustrated in FIG. 5.2. The match may be performed via other methods without departing from the invention.

In step 506, a response to the data access request that is based on the portion of the data chunks and/or the matched metadata is provided in response to the request.

In one or more embodiments of the invention, the response includes a portion of the data chunks.

In one or more embodiments of the invention, the response includes information based on the portion of the data chunks. For example, the response may specify that responsive data is stored in the data storage system without providing the responsive data (i.e., the portion of the data chunks).

In one or more embodiments of the invention, the response includes metadata associated with portion of the data chunks. For example, the response may include information based on object level metadata and/or chunk level metadata associated with all, or portion, of the portion of the data chunks.

The response may, for example, specify whether data that is responsive to the data access request is stored in the data storage system. The response may specify information regarding data stored in the data storage system that is responsive to the data access request at any level of granularity.

The method may end following step 506.

As noted above, a method illustrated in FIG. 5.2 may be performed to match the metadata to a portion of the data. FIG. 5.2 shows a flowchart of a method in accordance with one or more embodiments of the invention. The method depicted in FIG. 5.2 may be used to match metadata to a portion of the data in accordance with one or more embodiments of the invention. The method shown in FIG. 5.2 may be performed by, for example, a data storage system (e.g., 104, FIG. 1.1). Other components of the system illustrated in FIG. 1 may perform all, or a portion, of the method of FIG. 5.2 without departing from the invention.

While FIG. 5.2 is illustrated as a series of steps, any of the steps may be omitted, performed in a different order, additional steps may be included, and/or any or all of the steps may be performed in a parallel and/or partially overlapping manner without departing from the invention.

In step 510, a portion of regions that each store at least one data chunk of the portion of the data chunks is identified.

In one or more embodiments of the invention, the portion of the regions is identified by matching a dimension of the metadata characteristic of step 500 of FIG. 5.1 to an identifier of a computing resource aggregation and/or region. For example, as discussed above, the metadata characteristic may specify storage locations and/or regions (e.g., when information regarding data from a particular location/region is desired). The portion of the regions may be identified by matching the identifiers specified by the metadata characteristic to corresponding regions of the portion of the regions. To do so, object level metadata may be searched to identify the matching regions.

In step 512, sub-requests for respective regions of the portion of the regions are generated based on the data access request.

The sub-requests for the respective regions may be generated by limiting the number of dimensions of the metadata characteristic specified by the data access request to metadata characteristics that are relevant for each of the respective regions. For example, if a data access request specifies a metadata characteristic that indicates that only a computing resource aggregation in a single region is likely to include responsive data (e.g., by specifying that only the data in the computing resource aggregation is to be considered when formulating a response to the data access request by including, for example, an identifier of the computing resource aggregation in the metadata characteristic), only a sub-request for the region that includes the computing resource aggregation may be generated.

In step 514, the sub-requests are distributed to regional enumerators in respective regions of the portion of the regions.

In one or more embodiments of the invention, the sub-requests are distributed by sending copies of the sub-requests to the regional enumerators via corresponding messages.

In step 516, response to the sub-requests are aggregated. The responses may include, for example, information regarding data included in each of the regions that may be responsive to the data access request and/or the responsive data. The aggregated responses may be used to generate the response to the data access request.

The method may end following step 516.

The methods illustrated in FIGS. 5.1-5.2 may be performed, for example, by a global enumerator. In some embodiments of the invention, the methods performed in FIGS. 5.1-5.2 may be performed by an instance of a regional enumerator that is acting as both a regional enumerator and a global enumerator. By performing the methods illustrated in FIGS. 5.1-5.2, a system in accordance with embodiments of the invention may efficiently respond to data access requests by utilizing object level metadata and/or chunk level metadata to generate responses to data access requests rather than by crawling data or employing more computationally expensive methods of generating responses to data access requests.

As discussed above, sub-requests may be responded to by regional enumerators. FIG. 5.3 shows a flowchart of a method in accordance with one or more embodiments of the invention. The method depicted in FIG. 5.3 may be used to respond to a sub-request in accordance with one or more embodiments of the invention. The method shown in FIG. 5.3 may be performed by, for example, a data storage system (e.g., 104, FIG. 1.1). Other components of the system illustrated in FIG. 1 may perform all, or a portion, of the method of FIG. 5.3 without departing from the invention.

While FIG. 5.3 is illustrated as a series of steps, any of the steps may be omitted, performed in a different order, additional steps may be included, and/or any or all of the steps may be performed in a parallel and/or partially overlapping manner without departing from the invention.

In step 520, a sub-request is obtained.

In one or more embodiments of the invention, the sub-request is obtained from a global enumerator. The sub-request may specify one or more metadata characteristics. The one or more metadata characteristics may correspond to, for example, information that is included in object level metadata and/or chunk level metadata.

In step 522, copies of the sub-request are distributed to a portion of the storages in a region. The portion of the storages may include data that is likely to be responsive to the sub-request.

To identify the portion of the storages, object level metadata and/or chunk level metadata may be matched to one or more of the metadata characteristics. The sub-requests may be distributed to only the storages corresponding to the matched object level metadata and/or chunk level metadata. By doing so, only a subset of all of the storages in a region may receive sub-requests. Consequently, only storages that are likely to include responsive data may be encumbered with processing of the sub-requests.

For example, the regional enumerator of each region may have access to a cached (i.e., in memory data structure) version of object level metadata for all data chunks in a region. The metadata characteristics may be matched to the object level metadata to determine whether any of the data chunks in each of the storages is likely to be responsive to a sub-request. Sub-requests may be distributed to each of the regions corresponding to the matched metadata.

In step 524, the responses to the copies of the sub-requests are aggregated. For example, each storage that receives a copy of the sub-request may generate a response based on a match between the metadata characteristic specified by the sub-request and object level metadata and/or chunk level metadata stored in the storage. The storages may respond to the sub-requests based on the matches by including the corresponding data chunks and/or information regarding the data chunks and/or the matched metadata. The responses may be provided to regional enumerators of the corresponding regions.

In step 526, the aggregated responses to the copies of the sub-request are provided in response to the sub-request. For example, the responses may be combined into a single response that includes the information included in each of the responses to the copies of the sub-request. The response may deduplicate information that is duplicative in the responses to the sub-request obtained from the storages.

The method may end following step 526.

The method illustrated in FIG. 5.3 may be performed by regional enumerators. When performing the methods illustrate din FIG. 5.3, the regional enumerators may distribute sub-requests to computing resource aggregations and/or directly to storages included in each of the computing resource aggregations.

For example, in a scenario in which three computing clusters are disposed in a region, a regional enumerator may distribute sub-requests to each of the computing clusters. In turn the computing clusters may distribute copies of the sub-requests to each of the storages (or storage managers) hosted by the sub-requests. Each of the storages (or storage managers) may independently process the sub-requests in accordance with their individual workloads. By doing so, a data storage system in accordance with embodiments of the invention may provide a distributed method of addressing data access requests across any number of regions. Processing of the sub-requests may be performed asynchronously and, consequently, may be efficiently processed by each of the regions separately from the other regions.

As discussed above, copies of sub-requests may be serviced by individual storages and/or storage controllers of each computing device aggregation. FIG. 5.4 shows a flowchart of a method in accordance with one or more embodiments of the invention. The method depicted in FIG. 5.4 may be used to service a copy of a sub-request in accordance with one or more embodiments of the invention. The method shown in FIG. 5.4 may be performed by, for example, a data storage system (e.g., 104, FIG. 1.1). Other components of the system illustrated in FIG. 1 may perform all, or a portion, of the method of FIG. 5.4 without departing from the invention.

While FIG. 5.4 is illustrated as a series of steps, any of the steps may be omitted, performed in a different order, additional steps may be included, and/or any or all of the steps may be performed in a parallel and/or partially overlapping manner without departing from the invention.

In step 530, a copy of a sub-request is obtained. The copy of the sub-request may be obtained from a regional enumerator. The copy of the sub-request may be obtained from a storage manager. The copy of the sub-request may be obtained from other entities without departing from the invention.

For example, a regional enumerator may send a copy of the sub-request to a storage when servicing a sub-request. The sub-request may be included in a message sent to the storage by the regional enumerator.

In step 532, a metadata characteristic specified by the copy of the sub-request is matched to a portion of object level metadata and/or chunk level metadata.

As discussed above, sub-requests (and copies thereof) may specify uni-dimensional or multi-dimensional metadata characteristic. Portions of the metadata characteristic may match different portions of the object level metadata and/or the chunk level metadata.

For example, the metadata characteristic may specify a type of an organization. Similarly, object level metadata may specify an organization type for objects stored in the storage. The type of the organization may be compared to various portions of the object level metadata associated with corresponding objects to determine whether the metadata characteristic matches one or more of the portions of the object level metadata. Any such portions of the object level metadata that specify the same organization type, as specified by the metadata characteristic, may be considered to be matches.

In Step 534, a response to the copy of the sub-request is provided based on the matched metadata of Step 532. For example, information regarding the matched metadata and/or data associated with the matched metadata may be provided as the response.

The method may end following step 534.

The method illustrated in FIG. 5.4 may be performed asynchronously by any number of storage managers and/or storages without departing from the invention. For example, different storages may perform the same method at different points in time, at different rates, and/or otherwise in different manners in accordance with computing resource limitations of each of the aforementioned storages.

As discussed above, a data storage system may modify the manner in which it stores data in response to requests. FIGS. 6.1-6.2 show methods that may be used to service such requests. FIG. 6.1 shows a flowchart of a method in accordance with one or more embodiments of the invention. The method depicted in FIG. 6.1 may be used to respond to data integrity scheme change requests in accordance with one or more embodiments of the invention. The method shown in FIG. 6 may be performed by, for example, a data storage system (e.g., 104, FIG. 1.1). Other components of the system illustrated in FIG. 1 may perform all, or a portion, of the method of FIG. 6.1 without departing from the invention.

While FIG. 6.1 is illustrated as a series of steps, any of the steps may be omitted, performed in a different order, additional steps may be included, and/or any or all of the steps may be performed in a parallel and/or partially overlapping manner without departing from the invention.

In step 600, a request to use a new data integrity scheme to store data is obtained. The request may be obtained, for example, from a client.

The data may be stored in the data storage system using a data integrity scheme such as erasure coding. For example, the data may be stored as data integrity coded chunks. The data integrity coded chunks may be distributed across any number of fault domains (e.g., storages, computing resource aggregations, regions, etc.) in accordance with the data integrity scheme.

In step 602, it is determined whether the data storage system supports the new data integrity scheme. The determination may be made by comparing the number of fault domains required to implement the new data integrity scheme to the number of fault domains of a computing resource aggregation that stores the data. Such information regarding the computing resource aggregation may be determined dynamically or read from a data structure (e.g., regional capabilities) that includes such information. For example, a message requesting the number of fault domains that a computing resource aggregation includes may be sent to the computing resource aggregation and a corresponding response may be sent by the computing resource aggregation.

If the number of fault domains included in the computing resource aggregation is greater than the number required to implement the new data integrity scheme, then the data storage system supports the new data integrity scheme.

If the data storage system supports the new data integrity scheme, the method may proceed to step 604. If the data storage system does not support the new data integrity scheme, the method may end following step 602. In other words, the new data integrity scheme may not be implemented by the data storage system in response to the request.

In step 604, change data integrity scheme requests, based on the new data integrity scheme, are distributed to storage of the data storage system. The storages may be identified using the methods illustrated in FIGS. 5.1-5.4. For example, a data access request for the data may be generated and processed by the data storage system.

The change data integrity scheme request may specify the new data integrity scheme to be implemented and the data to which the new scheme is to be applied. For example, processing the data access request may provide identifiers of objects associated with the data. The object identifiers may be provided to the storages so that the storages are able to discriminate the data for which the new data integrity scheme is to be employed from other data.

The method may end following step 604.

As discussed above, a data storage system may generate change data integrity scheme requests and distribute them to storages. FIG. 6.2 shows a flowchart of a method in accordance with one or more embodiments of the invention. The method depicted in FIG. 6.2 may be used to service a change data integrity scheme request in accordance with one or more embodiments of the invention. The method shown in FIG. 6.2 may be performed by, for example, a data storage system (e.g., 104, FIG. 1.1). Other components of the system illustrated in FIG. 1 may perform all, or a portion, of the method of FIG. 6.2 without departing from the invention.

While FIG. 6.2 is illustrated as a series of steps, any of the steps may be omitted, performed in a different order, additional steps may be included, and/or any or all of the steps may be performed in a parallel and/or partially overlapping manner without departing from the invention.

In step 610, a change data integrity scheme request is obtained. The change data integrity scheme request may be obtained from, for example, a global enumerator or other type of entity performing the method of FIG. 6.1. The change data integrity scheme request may be obtained from a message sent by the entity performing all, or a portion, of the method of FIG. 6.1.

In step 612, data chunks impacted by the change data integrity scheme request are read. The data chunks may be read by, for example, generating a processing a data access request as discussed with respect to FIGS. 5.1-5.4. For example, the change data integrity scheme request may specify the identifiers of objects for which the data integrity scheme is to be changed. The identifiers may be included in the data access request to identify the data chunks. Information that may be used to identify the data chunks may be obtained from the response to the data access request. For example, the information may be identifiers of the data chunks.

In Step 614, new data chunks are generated based on the data chunks and the new data integrity scheme that is specified by the change data integrity scheme request.

In one or more embodiments of the invention, the new data chunks are generated by extracting the data from the data chunks by removing redundant data from the data chunks. For example, redundant data may have been added, along with the data, to the data chunks for data integrity purposes. The redundant data may enable parity checking (or other forms of integrity checking) to be performed on the data chunks. Once the redundant data is removed, the remaining data included in the data chunks may be used to synthesize the data (e.g., appending the remaining portions of data in the data chunks after removal of redundant data).

After the data is obtained from the data chunks, the new data chunks may be generated by performing an encoding algorithm. For example, the encoding algorithm may be erasure coding for a predetermined number of fault domains. The number of fault domains may correspond with the number of data chunks included in each word of the encoded data. The data chunks of each word may be designated for storage in a different fault domain for data integrity purposes.

In Step 616, the new data chunks are stored based on the new data integrity scheme. The new data integrity scheme may specify the number of fault domains across which the new data chunks are to be stored. The new data chunks may be stored in storages across the number of fault domains specified by the new data integrity scheme.

For example, in a scenario in which the new data integrity scheme is erasure coding for a particular number of fault domains, data chunks of each word of the new data chunks may be distributed across storages of each of the particular number of fault domains. Consequently, the data stored in the new data chunks may be recovered when one (or more depending on the new data integrity scheme) or more of the storages becomes unreachable due to, for example, failure of the one or more storages.

In step 618, the data chunks are deleted after the new data chunks are stored.

The method may end following step 618.

While performing steps 614-618, the steps may be performed for various portions of the data. For example, new data chunks for a first portion of the data may be generated and stored followed by deletion of the data chunks corresponding to the first portion of the data. The aforementioned process may be repeated sequentially and/or in parallel for other portions of the data.

Figure 7:
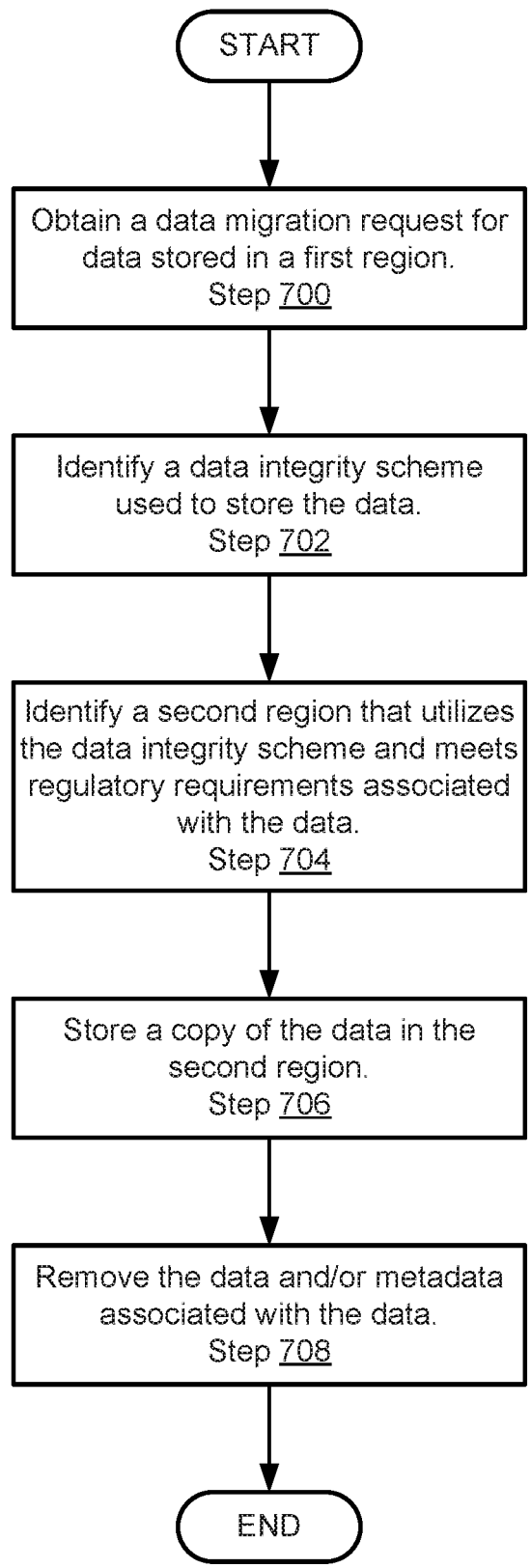
FIG. 7 shows a flowchart of a method of migrating data in accordance with one or more embodiments of the invention.

As discussed above, a data storage system in accordance with embodiments of the invention may provide data migration functionality. FIG. 7 shows a flowchart of a method in accordance with one or more embodiments of the invention. The method depicted in FIG. 7 may be used to service a data migration request in accordance with one or more embodiments of the invention. The method shown in FIG. 7 may be performed by, for example, a data storage system (e.g., 104, FIG. 1.1). Other components of the system illustrated in FIG. 1 may perform all, or a portion, of the method of FIG. 7 without departing from the invention.

While FIG. 7 is illustrated as a series of steps, any of the steps may be omitted, performed in a different order, additional steps may be included, and/or any or all of the steps may be performed in a parallel and/or partially overlapping manner without departing from the invention.

In step 700, a data migration request for data stored in a first region is obtained. The data migration request may specify that the data is to be moved to another region.

The data migration request may be obtained from, for example, a client. The data migration request may be obtained from other entities without departing from the invention.

In step 702, a data integrity scheme used to store the data is identified. The data integrity scheme may be identified based on object level metadata associated with the data. For example, the object level metadata may specify the data integrity scheme used to store the data. The data integrity scheme may be identified based on chunk level metadata or directly from data chunks associated with the data.

In step 704, a second region is identified that utilizes the data integrity scheme and that meets regulatory requirements associated with the data. The second region maybe identified based on information included in region capabilities (419, FIG. 4.1). For example, the region capabilities may specify the data integrity scheme used by each region (and/or more granularly at a computing resource aggregation level). Any of the regions that utilize the same data integrity scheme as the data may be identified as candidates for the second region.

Once the candidates are identified, the regulations that govern storage of data in each of the candidate regions may be compared to the type of the data. For example, some regulations may prevent storage of certain types of data (e.g., personal information) or discourage it. Any candidate regions that have regulations that may regulate the type of the data may be excluded. Any of the remaining regions of the candidate regions may be used as the second region.

Other criteria may also be used to identify the second region. For example, the availability of computing resources and/or workloads of each of the remaining regions may be taken into account when one of the remaining regions is identified as the second region.

In step 706, a copy of the data is stored in the second region. The copy of the second data may be stored in the second region by (i) identifying data chunks associated with the data and (ii) sending copies of the identified data chunks (and/or associated metadata) to computing resource aggregations of the second region for storage. To identify the data chunks, a data access request may be generated and processed, as discussed with respect to FIGS. 5.1-5.4. The data access requests may provide the identifiers of the data chunks.

In step 708, the data and/or metadata associated with the data is removed. For example, the data and/or the metadata may be deleted from the computing resource aggregations of the first region.

In one or more embodiments of the invention, the metadata associated with the data is not removed. The metadata may be retained in the first region. By doing so, a record of the history of the data, though now removed, may be maintained.

In one or more embodiments of the invention, the data and/or metadata is removed after confirmation of storage of the copy of the data in the second region is obtained. For example, the second region may provide notifications to the first region as copies of portions of the data are stored in the second region.

The method may end following step 708.

Using the method illustrated in FIG. 7, a data storage system may preferentially migrate data to new regions that utilize similar data integrity schemes. By doing so, the computational cost of migrating the data may be greatly reduced because conforming the data to a new data integrity scheme may be computationally costly.

To further clarify embodiments of the invention, a non-limiting example is provided in FIGS. 8.1-8.7. Each of these figures may illustrate a system similar to that of FIG. 1 at different points in times. For the sake of brevity, only a limited number of components of the system of FIG. 1 are illustrated in each of FIGS. 8.1-8.7.

Example

Consider a scenario as illustrated in FIG. 8.1 in which a data storage system (810) stores first data (830) in a computing resource aggregation (820). The first data (830) is stored in an erasure coded 3:1 format. In other words, the first data is coded into words having four chunks. The first data may include three such words (i.e., a first portion (832), a second portion (834), and a third portion (836). The chunks of each of the words are distributed across different fault domains of the computing resource aggregation (820).

For example, the computing resource aggregation (820) may include a computing cluster. The computing cluster may include four nodes that each include storage devices. The data chunks of each word may be stored in storages of the respective nodes. In other words, for a given word, a first chunk is stored in a first node, a second chunk is stored in a second node, a third chunk is stored in a third node, and a fourth chunk is stored in a fourth node.

At a first point in time, additional resources are added to the computing resource aggregation (820). Specifically, two new nodes are added to the computing cluster resulting in the computing resource aggregation (820) being capable of supporting different erasure coding schemes, e.g., a 4:2 encoding scheme.

After the first point in time, a client (800) that has rights in the first data (830) determines that the new erasure coding scheme is supported by the data storage system (810) and elects to change the manner in which the first data (830) is stored to use the new erasure coding scheme. To do so, the client (800) sends a new data integrity scheme request (802) to the data storage system (810) requesting that the first data (830) be stored using a 4:2 erasure coding scheme.

In response to receiving the new data integrity scheme request (802), the data storage system (810) distributes sub-requests to each of the storages that store chunks of the portions (832, 834, 836) of the first data (830).

In response to receiving the sub-requests, the storages add changing the data integrity scheme used to store each of the portions of the first data (830) to their respective work queues. Because the storage that stores the first portion (832) has a much lower work load than the storages storing the second portion (834) and the third portion (836), the storage storing the first portion begins processing the sub-request that it received earlier than the other storages being processing the sub-requests that they received.

To process the sub-request, the storages storing the first portion (832) obtain the data from the data chunks of the first portion (832). Using the obtained data, the storages recode the data in 4:2 erasure coding resulting in the generation of six data chunks corresponding to the data of the first portion (832). A copy of the first data (840) is then stored including the first portion (842) in 4:2 erasure coding, as illustrated in FIG. 8.2.

The first portion (842) is stored in 4:2 erasure coding by distributing the chunks across the six nodes of the cluster with one chunk being stored in a respective storage of each of the nodes. At this point in time, two copies of the first portion (e.g., 832, 834) of the first data are stored in the computing resource aggregation. Consequently, the first portion remains accessible throughout the process of recoding the first data.

After the first portion (842) is stored in 4:2 erasure coding, the first portion (832) stored in 3:1 erasure coding format is deleted as illustrated in FIG. 8.3. After the first portion (832) in 3:1 erasure coding is deleted, only the first portion (842) in 4:2 erasure coding is accessible.

After the first portion (832) in 3:1 erasure coding is deleted, the storages of the node storing the second portion (834) in 3:1 erasure coding begin processing the sub-request that the storages received. To do so, a similar process is performed. First, a copy of the second portion (844) in 4:2 format is generated using the second portion (834) in 3:1 erasure coding. The second portion (844) in 4:2 format is stored as part of the copy of the first data (840) as illustrated in FIG. 8.4.

Once the second portion (844) in 4:2 erasure coding is added to the copy of the first data (840), the second portion (834) in 3:1 erasure coding is deleted as illustrated in FIG. 8.5.

Lastly, after the second portion (834) in 3:1 erasure coding is deleted, the storages of the node storing the third portion (836) in 3:1 erasure coding begin processing the bus-request that the storages received. To do so, a similar process is performed. First, a copy of the third portion (846) in 4:2 format is generated using the third portion (836) in 3:1 erasure coding. The third portion (846) in 4:2 format is stored as part of the copy of the first data (840) as illustrated in FIG. 8.6.

Once the third portion (846) in 4:2 erasure coding is added to the copy of the first data (840), the third portion (836) in 3:1 erasure coding is deleted as illustrated in FIG. 8.7.

End of Example

A system in accordance with embodiments of the invention may perform actions similar to those carried out by the system discussed with respect to FIGS. 8.1-8.7. By doing so, the data integrity coding of data in a data storage system may be changed with minimal impact on the operation of the system. For example, when identifying and obtaining the data chunks corresponding to words of prior used data integrity schemes, the storages may directly obtain the data chunks using object level and/or chunk level metadata. By doing so, other system resources need not be consumed to generate and store data integrity coded data in accordance with a new data integrity scheme. Rather, only computing resources of the storages may be utilized to store the data in accordance with a new data integrity scheme.

Figure 9:
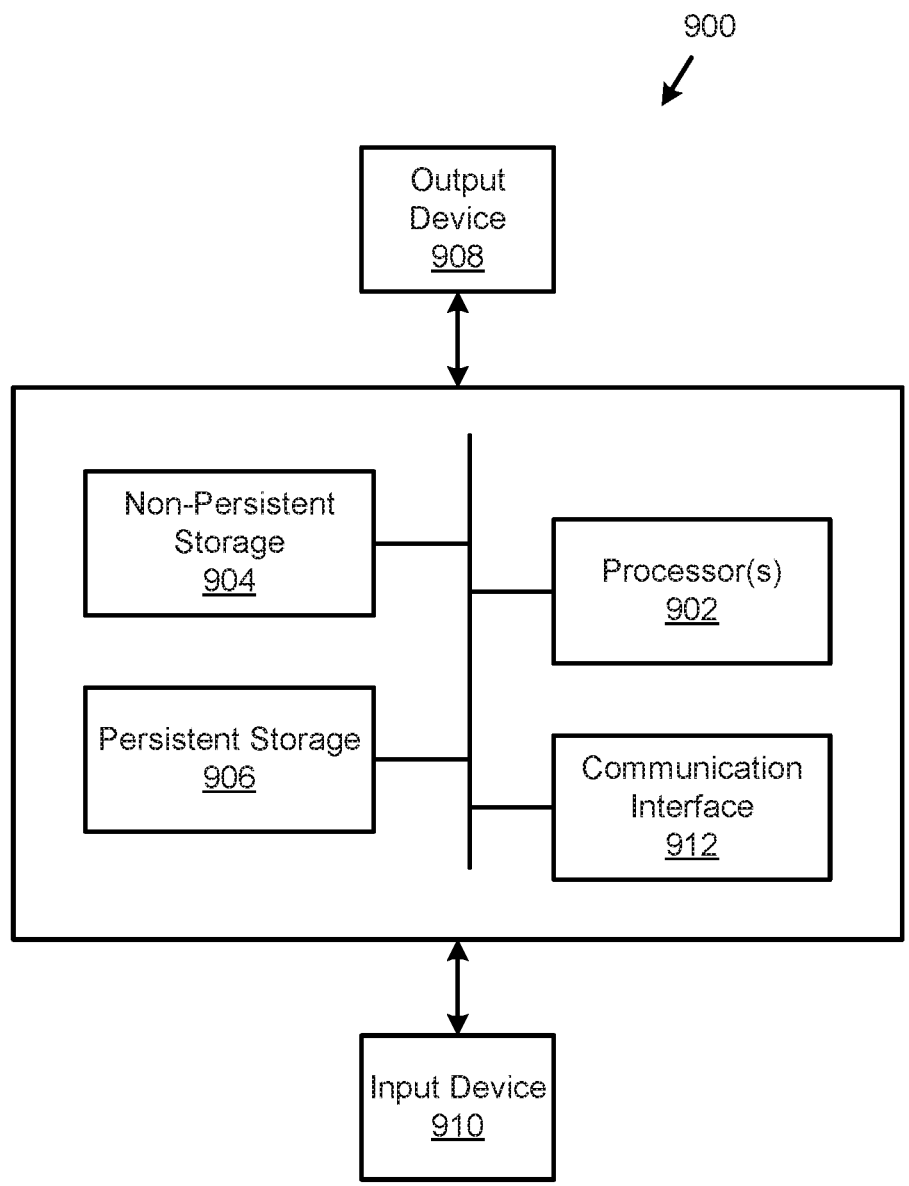
FIG. 9 shows a diagram of a computing device in accordance with one or more embodiments of the invention.

As discussed above, embodiments of the invention may be implemented using computing devices. FIG. 9 shows a diagram of a computing device in accordance with one or more embodiments of the invention. The computing device (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), input devices (910), output devices (908), and numerous other elements (not shown) and functionalities. Each of these components is described below.

In one embodiment of the invention, the computer processor(s) (902) may be an integrated circuit for processing instructions. For example, the computer processor(s) may be one or more cores or micro-cores of a processor. The computing device (900) may also include one or more input devices (910), such as a touchscreen, keyboard, mouse, microphone, touchpad, electronic pen, or any other type of input device. Further, the communication interface (912) may include an integrated circuit for connecting the computing device (900) to a network (not shown) (e.g., a local area network (LAN), a wide area network (WAN) such as the Internet, mobile network, or any other type of network) and/or to another device, such as another computing device.

In one embodiment of the invention, the computing device (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing devices exist, and the aforementioned input and output device(s) may take other forms.

Embodiments of the invention may provide a computationally efficient method for managing data in a data storage system. For example, embodiments of the invention may provide a method for changing a data integrity scheme used to store data. To do so, the system may utilize object level and/or chunk level metadata to obtain data that is necessary to recode the data without crawling the data or using other system resources. By doing so, the computational load for changing a data integrity scheme used to store data may be reduced when compared to other methods may utilize system resources such as processors that are separate from the storages that store data.

Additional embodiments of the invention may provide a method for migrating data that is more computationally efficient than other methods. To meet regulations that govern how data may be stored, data may need to be migrated to different regions. When data is migrated between regions, the manner in which data is stored in each region may impact the computational cost for migrating the data. For example, migrating the data from a first region that utilizes a first data integrity scheme for storing data to a second region that utilizes a different data integrity scheme may require that the data be recorded to use the different data integrity scheme. Recoding the data may be computationally expensive. To reduce the computational expense of migrating the data, embodiments of the invention may provide a method for automatically migrating data between regions that both utilize the same data integrity scheme and facilitate meeting of regulatory requirements. Consequently, migration of the data may be performed in a more computationally efficient way by avoiding the need to recode data for data integrity purposes when the data is migrated.

Thus, embodiments of the invention may address the problem of limited computing resources for managing and storing data.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A data storage system, comprising:
   accelerated storages that store data encoded using a first data integrity scheme that includes a first erasure coding scheme; and
   a global enumerator comprising a computer processor and programmed to:
      obtain a request to use a second data integrity scheme different from the first data integrity scheme to store the data;
      in response to obtaining the request:
         perform a recoding process for the data comprising:
            reading data chunks, corresponding to the data, from the storages;
            generating new data chunks based on:
               the read data chunks; and
               the second data integrity scheme;
            storing the new data chunks in the accelerated storages in an arrangement specified by the second data integrity scheme; and
            deleting the data chunks after storing the new data chunks.

2. The data storage system of claim 1, wherein each of the accelerated storages stores a unique portion of the data chunks.

3. The data storage system of claim 1, wherein the recoding process for the data is performed by invoking computing accelerated functionality of the accelerated storages.

4. The data storage system of claim 3, wherein the computing accelerated functionality of each of the accelerated storages operates independently from the computing accelerated functionality of the other accelerated storages.

5. The data storage system of claim 1, wherein generating the new data chunks comprises:
   after reading a portion of the data chunks corresponding to an encoded fragment:
      recover a portion of the data using the encoded fragment; and
      recoding the portion of the data based on the second data integrity scheme.

6. The data storage system of claim 5, wherein recovering the portion of the data using the encoded fragment comprises:
removing redundant data from the portion of the data.

7. The data storage system of claim 1, wherein reading the data chunks comprises:
matching an identifier of the data to a portion of object level metadata associated with the data; and
using identifiers of the data chunks specified by the object level metadata to access the data chunks.

8. The data storage system of claim 1, wherein storing the new data chunks in the storages comprises:
generating chunk level metadata corresponding to each of the new data chunks;
generating object level metadata corresponding to a portion of the new data chunks; and
adding identifiers of the new data chunks to the object level metadata.

9. The data storage system of claim 1, wherein the first erasure coding scheme utilizes a first number of fault domains, wherein the second data integrity scheme is a second erasure coding scheme that utilizes a second number of fault domains, wherein the first number of fault domains is different from the second number of fault domains.

10. A method for managing a data storage system, comprising:
obtaining a request to use a new data integrity scheme to store data that is stored in accelerated storages using a first data integrity scheme that includes a first erasure coding scheme;
in response to obtaining the request:
performing a recoding process for the data comprising:
reading data chunks, corresponding to the data, from the storages;
generating new data chunks based on:
the read data chunks; and
a second data integrity scheme different from the first data integrity scheme and specified by the request;
storing the new data chunks in the accelerated storages in an arrangement specified by the second data integrity scheme; and
deleting the data chunks after storing the new data chunks.

11. The method of claim 10, wherein each of the accelerated storages stores a unique portion of the data chunks.

12. The method of claim 10, wherein the recoding process for the data is performed by invoking computing accelerated functionality of the accelerated storages.

13. The method of claim 12, wherein the computing accelerated functionality of each of the accelerated storages operates independently from the computing accelerated functionality of the other accelerated storages.

14. The method of claim 10, wherein generating the new data chunks comprises:
after reading a portion of the data chunks corresponding to an encoded fragment:
recover a portion of the data using the encoded fragment; and
recoding the portion of the data based on the second data integrity scheme.

15. A non-transitory computer readable medium comprising computer readable program code, which when executed by a computer processor enables the computer processor to perform a method for managing a data storage system, the method comprising:
obtaining a request to use a new data integrity scheme to store data that is stored in accelerated storages using the first data integrity scheme, wherein the first data integrity scheme includes a first erasure coding scheme and wherein the new data integrity scheme is different than the first data integrity scheme;
in response to obtaining the request:
performing a recoding process for the data comprising:
reading data chunks, corresponding to the data, from the storages;
generating new data chunks based on:
the read data chunks; and
the new data integrity scheme specified by the request;
storing the new data chunks in the accelerated storages in an arrangement specified by the new second data integrity scheme; and
deleting the data chunks after storing the new data chunks.

16. The non-transitory computer readable medium of claim 15, wherein each of the accelerated storages stores a unique portion of the data chunks.

17. The non-transitory computer readable medium of claim 15, wherein the recoding process for the data is performed by invoking computing accelerated functionality of the accelerated storages.

18. The non-transitory computer readable medium of claim 17, wherein the computing accelerated functionality of each of the accelerated storages operates independently from the computing accelerated functionality of the other accelerated storages.

19. The non-transitory computer readable medium of claim 15, wherein generating the new data chunks comprises:
after reading a portion of the data chunks corresponding to an encoded fragment:
recover a portion of the data using the encoded fragment; and
recoding the portion of the data based on the new data integrity scheme.

* * * * *